United States Patent
Suzuki et al.

(10) Patent No.: US 10,434,616 B2
(45) Date of Patent: Oct. 8, 2019

(54) MACHINING SYSTEM

(71) Applicant: FUJI CORPORATION, Chiryu-shi (JP)

(72) Inventors: Jun Suzuki, Kasugai (JP); Shigefumi Suzuyama, Toyota (JP); Shuichi Hirata, Toyota (JP); Kenji Mizuta, Kasugai (JP); Jun Yanagisaki, Toyota (JP); Osamu Nagai, Nagoya (JP)

(73) Assignee: FUJI CORPORATION, Chiryn-shi (JP)

( * ) Notice: Subject to any disclaimer, the term of this patent is extended or adjusted under 35 U.S.C. 154(b) by 0 days.

(21) Appl. No.: 15/764,588

(22) PCT Filed: Oct. 20, 2015

(86) PCT No.: PCT/JP2015/079556
§ 371 (c)(1),
(2) Date: Mar. 29, 2018

(87) PCT Pub. No.: WO2017/068643
PCT Pub. Date: Apr. 27, 2017

(65) Prior Publication Data
US 2018/0272492 A1    Sep. 27, 2018

(51) Int. Cl.
*B23Q 37/00*    (2006.01)
*B23Q 11/08*    (2006.01)
(Continued)

(52) U.S. Cl.
CPC ............... *B23Q 37/00* (2013.01); *B23B 3/10* (2013.01); *B23B 3/161* (2013.01); *B23Q 9/0064* (2013.01);
(Continued)

(58) Field of Classification Search
CPC ........ B23Q 39/02; B23Q 39/04; B23Q 41/00; B23Q 41/02; B23Q 41/04; B23Q 41/06;
(Continued)

(56) References Cited

U.S. PATENT DOCUMENTS 3,662,442 A * 5/1972 Noa ................... B23Q 3/15506
483/27
5,020,201 A * 6/1991 Kitamura ................. B23Q 1/03
29/27 C
(Continued)

FOREIGN PATENT DOCUMENTS

JP    6-143102 A    5/1994
JP    6-218602 A    8/1994
(Continued)

OTHER PUBLICATIONS

International Search Report dated Nov. 24, 2015 in PCT/JP2015/079556 filed Oct. 20, 2015.

*Primary Examiner* — Willmon Fridie, Jr.
(74) *Attorney, Agent, or Firm* — Oblon, McClelland, Maier & Neustadt, L.L.P.

(57) ABSTRACT

Provided is a highly practical machining system. The machining system is configured to include a base, and multiple machining modules which are detachably disposed on the base to be aligned with one another in a left-right direction. Machining is sequentially performed by the multiple machining modules with respect to a workpiece. At least one of the multiple machining modules is a vertical lathe module. It is possible to configure a compact system in which machining can be performed by a vertical lathe.

5 Claims, 17 Drawing Sheets

(51) Int. Cl.
  *B23Q 39/02* (2006.01)
  *B23B 3/10* (2006.01)
  *B23Q 9/00* (2006.01)
  *B23B 3/16* (2006.01)

(52) U.S. Cl.
  CPC ............ *B23Q 11/08* (2013.01); *B23Q 37/007* (2013.01); *B23Q 39/02* (2013.01); *B23Q 11/0891* (2013.01); *B23Q 2220/002* (2013.01)

(58) Field of Classification Search
  CPC .. B23Q 37/00; B23Q 37/02; B23Q 2039/004; Y10T 82/2511
  See application file for complete search history.

(56) References Cited

U.S. PATENT DOCUMENTS

| | | | | |
|---|---|---|---|---|
| 5,182,974 | A * | 2/1993 | Cudini | B23B 3/30 82/124 |
| 5,189,624 | A * | 2/1993 | Barlow | G05B 19/182 700/169 |
| 8,974,357 | B2 * | 3/2015 | Kitayama | B23B 3/10 483/17 |
| 9,919,398 | B2 * | 3/2018 | Mizuta | B23Q 39/04 |
| 2002/0017888 | A1 * | 2/2002 | Ueda | B23Q 16/025 318/567 |
| 2005/0061120 | A1 * | 3/2005 | Hammer | B23B 3/06 82/122 |
| 2011/0236146 | A1 * | 9/2011 | De Koning | B23Q 7/1431 409/131 |
| 2016/0214226 | A1 * | 7/2016 | Nagato | B23Q 39/04 |
| 2016/0214227 | A1 * | 7/2016 | Nagato | B23Q 39/04 |
| 2017/0225285 | A1 * | 8/2017 | Asakawa | B23P 23/00 |
| 2017/0232567 | A1 * | 8/2017 | Suzuyama | B23Q 39/04 29/564 |
| 2017/0266772 | A1 * | 9/2017 | Asakawa | B23Q 3/15526 |
| 2017/0304979 | A1 * | 10/2017 | Hirata | B23Q 39/04 |
| 2018/0250781 | A1 * | 9/2018 | Gauli | B23Q 7/1494 |

FOREIGN PATENT DOCUMENTS

| | | |
|---|---|---|
| JP | 2005-219167 A | 8/2005 |
| JP | 2010-64158 A | 3/2010 |
| JP | 2014-161976 A | 9/2014 |
| WO | 2015/037147 A1 | 3/2015 |

\* cited by examiner

DOWN ←——→ UP

MACHINING SYSTEM

TECHNICAL FIELD

The present application relates to a machining system in which multiple machining modules are disposed to be aligned with one another.

BACKGROUND ART

As a machining system in which multiple machining modules are disposed to be aligned with one another and machining is sequentially performed by the multiple machining modules with respect to a workpiece, there is a technology as disclosed in PTL 1. On the other hand, as an articulated robot which conveys workpieces in machining equipment (machine tool), there is a technology as disclosed in PTL 2.

CITATION LIST

Patent Literature

PTL 1: WO2015/037147
PTL 2: JP-A-2010-64158

SUMMARY

Technical Problem

The machining system described above is a unique system in which one workpiece is subjected to machining by multiple machining modules. However, there remains plenty of room for amelioration, and it is possible to improve the practicality of the machining system by performing certain amelioration. The present disclosure has been made in consideration of the foregoing circumstances, and an object thereof is to provide a highly practical machining system.

Solution to Problem

In order to achieve the object, according to the present disclosure, there is provided a machining system configured to include a base, and a plurality of machining modules which are detachably disposed on the base to be aligned with each other in a left-right direction. Machining is sequentially performed by the plurality of machining modules with respect to a workpiece. At least one of the plurality of machining modules is a vertical lathe module.

Advantageous Effects

According to the machining system of the present disclosure, it is possible to configure a compact system in which machining can be performed by a vertical lathe.

Hereinafter, examples of some aspects of the present disclosure recognized to be claimable in this application (hereinafter, will be sometimes referred to as the "claimable invention") will be described. Similar to Claims, the aspects are divided into sections. Each section is numbered and will be disclosed in a form of citing other sections by its number as necessary. This is merely to facilitate understanding of the claimable invention, and it is not intended to limit combinations of constituent elements constituting the inventions to those disclosed in each of the following sections. That is, the claimable invention ought to be construed in consideration of the disclosure accompanying each of the following sections, the disclosure of the embodiment, and the like. An aspect constituted by adding another constituent element to the aspect of each section and an aspect constituted by deleting a certain constituent element from the aspect of each section can also be an aspect of the claimable invention, as long as the aspects follow the construction thereof.

In each of the following sections, Section (11) corresponds to claim 1, Section (13) corresponds to claim 2, Section (14) corresponds to claim 3, Section (22) corresponds to claim 4, Section (23) corresponds to claim 5, Section (33) corresponds to claim 6, and Section (36) corresponds to claim 7, respectively.

<<Precondition for Configuration>>

(1) A machining system is configured to include a base, and a plurality of machining modules which are detachably disposed on the base to be aligned with each other in a left-right direction. Machining is sequentially performed by the plurality of machining modules with respect to a workpiece.

The present aspect is a basic aspect. Various types of modules can be employed as the machining module. Specifically, for example, including a vertical lathe module (will be described below), it is possible to employ a centering machining module performing centering machining with respect to an end face in a longitudinal direction, a horizontal lathe module in which a horizontal lathe serves as a main constituent, a milling machine module performing milling machining, and the like. In the system of the present aspect, since various types of machining modules are disposed, machining can be performed with respect to various types of workpieces. In addition, since the machining module is replaced with a different machining module, a general-purpose system is realized.

(2) In the machining system according to Section (1), each of the plurality of machining modules may be independently drawn out forward.

According to the present aspect, it is possible to easily perform replacement or the like of a tool in each module in front of the module. It is particularly effective in the aspect (will be described below), that is, in the aspect in which machining modules are disposed adjacent to each other. The machining modules may be able to be drawn out not only forward but also rearward. In addition, the machining modules may be replaced when being drawn out.

(3) In the machining system according to Section (1) or (2), the plurality of machining modules are disposed adjacent to each other.

According to the present aspect, it is possible to establish a system in which the width in the left-right direction, in other words, the width in a workpiece conveying direction (can also be considered as a "line length") is short.

<<Basic Configuration of Vertical Lathe Module>>

(11) In the machining system according to any one of Sections (1) to (3), at least one of the plurality of machining modules is a vertical lathe module.

In short, the present aspect is an aspect in which a vertical lathe is modularized in the machining system. In the related art, there has been no system in which a vertical lathe is modularized. In that regard, the present aspect is a unique and novel system.

(12) In the machining system according to Section (11), as one of the plurality of machining modules, the centering machining module performing centering machining with respect to an upper end face of a workpiece is disposed on an upstream side of the vertical lathe module in a conveyance direction of the workpiece.

According to the present aspect, centering machining of a workpiece is performed by another module before machining is performed by the vertical lathe module. It is particularly effective in a case where there is a need to perform tailstocking in machining using a vertical lathe module. The centering machining module may be able to perform not only centering machining but also machining of cutting an end face through milling. Incidentally, the centering machining module in the present aspect can be configured to perform machining with respect to end faces on both sides by turning a workpiece upside down.

(13) In the machining system according to Section (11) or (12), the vertical lathe module includes a spindle which supports a lower end portion of a workpiece and rotates the workpiece around an axis line extending in an up-down direction; a column which is erected behind the spindle; a beam which is supported by the column in a posture extending in a front-rear direction to be movable in the up-down direction and the front-rear direction; a turret which is supported at a front end of the beam, holds a plurality of edged tools, and is intermittently rotatable around an axis line parallel to the axis line of the spindle; and a beam moving device which moves the beam in the up-down direction and the front-rear direction in order to move the turret when machining of a workpiece is performed.

The present aspect relates to a basic structure of the vertical lathe module. According to the present aspect, since the column, the spindle, and the turret can be disposed in a row in the front-rear direction, it is possible to realize a module having a narrow width in the left-right direction. In addition, for example, it is possible to easily perform replacement or the like of the edged tools held in the turret by disposing the turret in front of the spindle.

(14) In the machining system according to Section (13), the beam is disposed to deviate to one side and the spindle is disposed to deviate to the other side in the left-right direction individually from a center of the vertical lathe module in the left-right direction.

According to the present aspect, since the beam and the spindle are eccentrically disposed away from each other in the left-right direction, when machining of a relatively long workpiece is performed, the machining can be easily performed without causing the beam to interfere with the workpiece. In addition, in the case where the diameter of a workpiece is relatively small compared to the diameter of the turret, the width of the module in the left-right direction can be set to a width corresponding to the diameter of the turret, so that the module can be compact in size in the left-right direction.

(15) In the machining system according to Section (13) or (14), the vertical lathe module is provided with a spindle cooling device configured to include a duct whose one end is open to a cavity provided on the periphery of the spindle, and a fan which is provided at the other end of the duct and suctions air inside the duct.

When machining is performed, the spindle becomes a large heating element. Therefore, according to the present aspect, it is possible to effectively cool the spindle using the cooling device.

<<Tailstock Device>>

(21) In the machining system according to any one of Sections (13) to (15), the vertical lathe module includes a tailstock device by which a rotary center at an upper end of a workpiece supported by the spindle is pressed downward.

According to the present aspect, since the tailstock device is provided, it is possible to perform precise machining with respect to a relatively long workpiece.

(22) In the machining system according to Section (21), the tailstock device has a rotation center whose tip portion is pressed against a workpiece, a tailstock which holds the rotation center and is supported by the column to be movable in the up-down direction along the column, and a tailstock moving device which moves the tailstock in the up-down direction.

The present aspect relates to a basic structure of the tailstock device. For example, if the aspect described above, that is, the aspect in which the beam supporting the turret and the spindle are eccentrically disposed away from each other in the left-right direction and the present aspect are combined, it is possible to avoid interference between a movement of the tailstock and a movement of the beam, and it is possible to establish a module compact in size in the left-right direction.

(23) In the machining system according to Section (22), the tailstock includes a casing; a holder which is held inside the casing to be movable in the up-down direction and holds the rotation center; a liquid chamber which is defined by the casing and the holder, an inside of which is filled with an operating fluid, and a volume of which fluctuates due to a movement of the holder with respect to the casing; and a pressure applying mechanism which applies a pressure corresponding to a fluctuation in volume of the liquid chamber to the operating fluid inside the liquid chamber in order to generate a force reducing a movement of the holder with respect to the casing with a magnitude corresponding to an amount of the movement. The tailstock device is configured to generate a force of the rotation center pressing a workpiece, depending on the pressure applying mechanism.

The present aspect relates to the structure of the tailstock. According to the present aspect, since the tailstock is moved until the rotation center comes into contact with a workpiece, and the tailstock is further moved from the contact position, it is possible to press the workpiece with a pressing force having a magnitude corresponding to the increased movement amount thereof. That is, the pressing force can be precisely managed by employing a servomotor or the like as a driving source of the tailstock moving device. Since a pressing force is generated via the operating fluid, unlike a case where a pressing force is directly generated by a spring, a workpiece can be pressed in a relatively smooth manner.

(24) In the machining system according to Section (23), the pressure applying mechanism is configured to include an auxiliary liquid chamber which communicates with the liquid chamber, a plunger which is installed to enter the auxiliary liquid chamber and may move forward and rearward with respect to the auxiliary liquid chamber in accordance with a fluctuation in volume of the liquid chamber, and a spring which biases the plunger such that a biasing force changes in accordance with forward and rearward movements of the plunger.

The present aspect relates to a specific structure of the pressure applying mechanism included in the tailstock. The present aspect does not exclude an aspect in which a plurality of plungers enter one auxiliary liquid chamber and the plurality of plungers are respectively biased by a plurality of springs. Since the plurality of plungers are provided, each of the plungers can be reduced in diameter. Therefore, it is possible to establish a relatively compact pressure applying mechanism. Since the spring can be replaced with a spring having a different spring constant, it is possible to change the magnitude of a pressing force within a relatively large range without significantly changing the movement amount of the tailstock.

<<Housing of Vertical Lathe Module>>

(31) In the machining system according to any one of Sections (13) to (24), the vertical lathe module includes a housing surrounding a workpiece supported by the spindle and the turret in order to define a machining space in front of the column.

According to the present aspect, for example, it is possible to effectively prevent a coolant from scattering out of the module during machining.

(32) In the machining system according to Section (31), the housing has a workpiece conveying opening which is provided in front of the housing for carrying in and carrying out a workpiece with respect to the machining space, and a shutter for opening and closing the workpiece conveying opening.

According to the present aspect, it is possible to prevent the scattering of a coolant and to easily carry in and carry out a workpiece.

(33) In the machining system according to Section (32), the shutter has a plurality of shutter plates which are disposed to be aligned with one another in an up-down direction in a state where the shutter is closed and each of which partially covers the workpiece conveying opening, and a telescopic shutter plate moving mechanism which vertically moves the plurality of shutter plates in an interlocked manner to open and close the workpiece conveying opening such that a state where the plurality of shutter plates overlap one another and a state where the plurality of shutter plates are disposed to be aligned with one another in the up-down direction are selectively realized.

According to the present aspect, since a telescopic shutter is employed, the workpiece conveying opening can be relatively increased, and a relatively long workpiece is easily carried in and carried out.

(34) In the machining system according to any one of Sections (31) to (33), the beam is disposed to deviate to one side and the spindle is disposed to deviate to the other side in the left-right direction individually from a center of the vertical lathe module in the left-right direction. The vertical lathe module includes a tailstock device by which a rotary center at an upper end of a workpiece supported by the spindle is pressed downward. The tailstock device has (a) a rotation center whose tip portion is pressed against a workpiece, (b) a tailstock which holds the rotation center and is supported by the column to be movable in the up-down direction along the column, and (c) a tailstock moving device which moves the tailstock in the up-down direction. The housing has a beam opening and a tailstock opening which are each provided on a rear side while the beam opening allows the beam to be inserted through an inside of the housing and the tailstock opening allows the tailstock to enter the inside of the housing, a beam opening movement allowing mechanism which maintains the machining space defined by the housing and allows the beam opening to vertically move in accordance with a vertical movement of the beam, and a tailstock opening movement allowing mechanism which maintains the machining space defined by the housing and allows the tailstock opening to vertically move in accordance with a vertical movement of the tailstock.

The present aspect relates to a cover on the rear side in a configuration including the beam supporting the turret and the tailstock device. According to the present aspect, it is possible to effectively cover the rear side of the housing without hindering movements of the beam and the tailstock in the up-down direction.

(35) In the machining system according to Section (34), each of the beam opening movement allowing mechanism and the tailstock opening movement allowing mechanism has a frame which defines the opening and is vertically movable, a plurality of cover plates which are respectively disposed above and below the frame, and a telescopic cover plate movement allowing mechanism which allows the plurality of cover plates to move in accordance with a movement of the frame between a state where the plurality of cover plates overlap each other and a state where the plurality of cover plates are disposed to be aligned with one another in the up-down direction.

According to the present aspect, since a telescopic cover is employed, it is easy to cover the rear side of the housing and to move the beam and the tailstock over a relatively long distance in the up-down direction.

(36) In the machining system according to Section (35), the beam opening movement allowing mechanism and the tailstock opening movement allowing mechanism are independent units, which are installed to be aligned with each other in a left-right direction, and the frame of the beam opening movement allowing mechanism has a shape open toward the tailstock opening moving allowing mechanism and the frame of the tailstock opening moving allowing mechanism is formed to be open toward the beam opening moving allowing mechanism, thereby the mechanisms is capable of being detached in a manner of being separated to the left and the right.

According to the present aspect, since the cover can be separated to the left and the right, it is possible to easily perform cleaning, maintenance, and the like of the cover.

<<Workpiece Conveyance and Attaching-detaching Robot>>

(41) In the machining system according to any one of Sections (1) to (36), the machining system is configured to include a workpiece conveyance and attaching-detaching robot which is disposed in front of the base, conveys a workpiece in the left-right direction, and attaches and detaches the workpiece with respect to each of the plurality of machining modules.

According to the present aspect, since a so-called robot-type conveyance and attaching-detaching device is employed, a workpiece can be conveyed, attached, and detached with a high degree of freedom.

(41)' The workpiece conveyance and attaching-detaching robot is used for conveying a workpiece in the left-right direction and attaching and detaching the workpiece with respect to each of the plurality of working modules in a system in which the plurality of machining modules are disposed to be aligned with one another in the left-right direction.

The present aspect is an aspect for changing the categories of the claimable invention, specifically relates to the workpiece conveyance and attaching-detaching robot which can be used in the system described hereinabove. According to the present aspect, in the machining system, it is possible to convey, attach, and detach a workpiece with a high degree of freedom.

(42) In the machining system according to Section (41) or the workpiece conveyance and attaching-detaching robot according to Section (41)', the workpiece conveyance and attaching-detaching robot is configured to include a base, a support member which is supported by the base and has a pair of struts individually extending in the up-down direction and being erected with a space therebetween, a first arm whose base end section is supported by upper end portions of the pair of struts to be interposed between the pair of struts and which is rotatable around a first rotation axis line perpendicular to the up-down direction, a second arm whose base end section is supported by a tip portion of the first arm and which is rotatable around a second rotation axis line parallel to the first rotation axis line, a wrist member which is supported by a tip portion of the second arm and is rotatable around a third rotation axis line parallel to the first rotation axis line and the second rotation axis line, and a workpiece holder which is supported by the wrist member and holds a workpiece in a posture in which the longitudinal direction of the workpiece extends in a manner parallel to a surface perpendicular to the first rotation axis line, the second rotation axis line, and the third rotation axis line. In a state where the first arm and the second arm are folded, the first arm, the second arm, the wrist member, the workpiece holder, and a workpiece held by the workpiece holder are accommodated between the pair of struts.

In the present aspect, since two arms linked in serial are employed, a workpiece can be attached and detached with a particularly high degree of freedom, and a workpiece or the like can be accommodated between the pair of struts in a posture in which the two arms are folded. Therefore, a workpiece can be held in a compact state and can be conveyed between the modules, so that the machining system itself can be compact in size.

(43) In the machining system or the workpiece conveyance and attaching-detaching robot according to Section (42), the workpiece holder is supported by the wrist member to be able to oscillate around a rocking axis line extending in a manner parallel to a surface perpendicular to the first rotation axis line, the second rotation axis line, and the third rotation axis line.

According to the present aspect, since the workpiece holder can oscillate, it is possible to attach and detach a workpiece with a higher degree of freedom.

(44) In the machining system or the workpiece conveyance and attaching-detaching robot according to Section (42) or (43), the workpiece conveyance and attaching-detaching robot includes a plurality of workpiece holders each of which serves as a workpiece holder. A plurality of workpieces is capable of being held by the plurality of workpiece holders at the same time.

According to the present aspect, it is possible to separate (unload) a workpiece from one module and to mount (load) a workpiece in the module in a sequential manner, so that it is possible to shorten a time for attaching and detaching. As a result, it is possible to establish a machining system having high productivity. In combination with the aspect described above, that is, the aspect in which the workpiece holder can oscillate, one of the plurality of workpiece holders can be easily positioned at a position for selective attaching and detaching.

(45) In the machining system or the workpiece conveyance and attaching-detaching robot according to any one of Sections (41) and (41)' to (44), the support member of the workpiece conveyance and attaching-detaching robot is supported by the base which is rotatable around a rotation axis line extending in the up-down direction.

According to the present aspect, for example, since the support member is rotatable, it is possible to easily carry in a workpiece from the left and right sides of the machining system and carry out a workpiece to the left and right sides of the machining system.

(46) In the machining system or the workpiece conveyance and attaching-detaching robot according to any one of Sections (41) and (41)' to (45), the workpiece conveyance and attaching-detaching robot includes a base moving device which moves the base in the left-right direction.

According to the present aspect, a workpiece can be conveyed between the modules depending on a function of the base moving device.

DESCRIPTION OF EMBODIMENT

Hereinafter, a representative embodiment of the claimable invention will be described in detail as Example with reference to the drawings. In addition to Example, including the aspects disclosed in Sections of [Aspects of Invention], the claimable invention can be executed in various types of aspects subjected to various types of changes and amelioration based on knowledge of those skilled in the art. In addition, it is possible to configure an alternative embodiment of the following Example by utilizing the technical matter disclosed in the description of each section of [Aspects of Invention].

EXAMPLE

[A] Overall Configuration of Machining System

Figure 1:
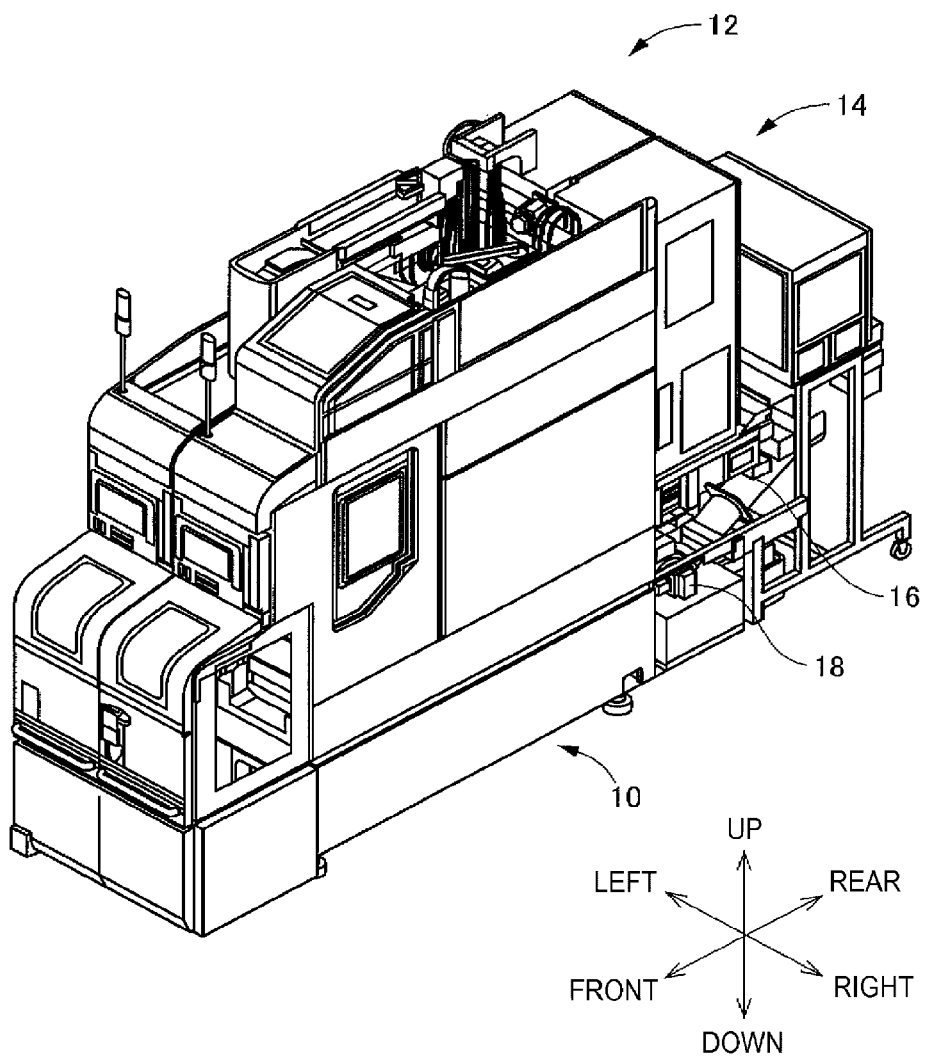
FIG. 1 is a perspective view illustrating a machining system in its entirety of Example.

As illustrated in FIG. 1, a machining system of Example is configured to include a base 10 and multiple machining modules disposed on the base 10. In a broad way, the machining system is a type of system in which multiple machining modules are disposed to be aligned with one another. Specifically, the multiple machining modules are constituted of a centering machining module 12 and a vertical lathe module 14. As illustrated in the drawing, for the definition of direction, the centering machining module 12 and the vertical lathe module 14 are disposed to be aligned with each other in a left-right direction adjacent. From the left side toward the right side in FIG. 1, machining is sequentially performed by the centering machining module 12 and the vertical lathe module 14 with respect to one workpiece. In the drawing, although it is hidden inside an exterior panel, a workpiece conveyance and attaching-detaching robot for conveying a workpiece and attaching and detaching the workpiece with respect to each of the centering machining module 12 and the vertical lathe module 14 is disposed in front of the base 10.

A coolant tank is installed inside the base 10. Cut chips generated during machining performed by the centering machining module 12 and the vertical lathe module 14, and a coolant applied to a workpiece when machining is performed by the same are collected in the coolant tank. Collected cut chips are discharged rearward by a cut-chip conveyor 16, and collected coolant circulates by means of a coolant pump 18.

This machining system is a system for performing centering machining and lathe machining with respect to a relatively long workpiece. As a feature thereof, the width in the left-right direction, that is, in a direction in which a workpiece is conveyed (so-called "line length") is considerably small. In addition, since the centering machining module 12 and the vertical lathe module 14 can be replaced with a different machining module, the system can perform various types of machining through the replacement in accordance with a workpiece, thereby having high general-purpose characteristics.

[B] Centering Machining Module

Figure 2:
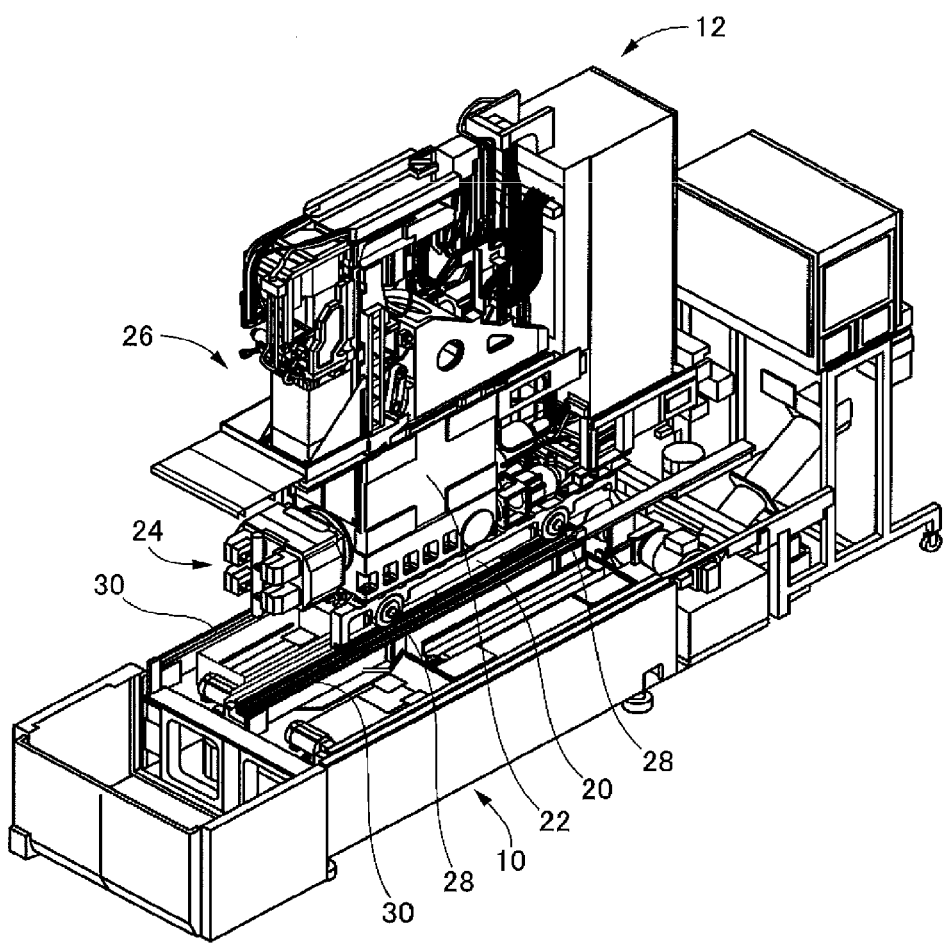
FIG. 2 is a perspective view illustrating a centering machining module disposed in the machining system in a state where an exterior panel is removed.

As seen from FIG. 2 illustrating a state where the exterior panel is removed, in a broad sense, the centering machining module 12 is configured to include abase 20, a column 22 which is erected in the base 20, a workpiece holding device 24 which is supported by the column 22 and holds a workpiece, and a machining head 26 for performing machining with respect to a workpiece held by the workpiece holding device 24.

Wheels 28 are provided in the base 20. Meanwhile, rails 30 are built in the base 10 in a posture extending in a front-rear direction. The centering machining module 12 is disposed on the base 10 such that the wheels 28 are settled on the rails 30. As the wheels 28 roll on the rails 30, the centering machining module 12 is movable in the front-rear direction. While the machining system is in operation, the centering machining module 12 is positionally aligned with the base 10, and the centering machining module 12 can be drawn out forward during replacement or the like of a tool (will be described below). The centering machining module 12 can be drawn out rearward when being replaced with a different machining module.

Figure 3:
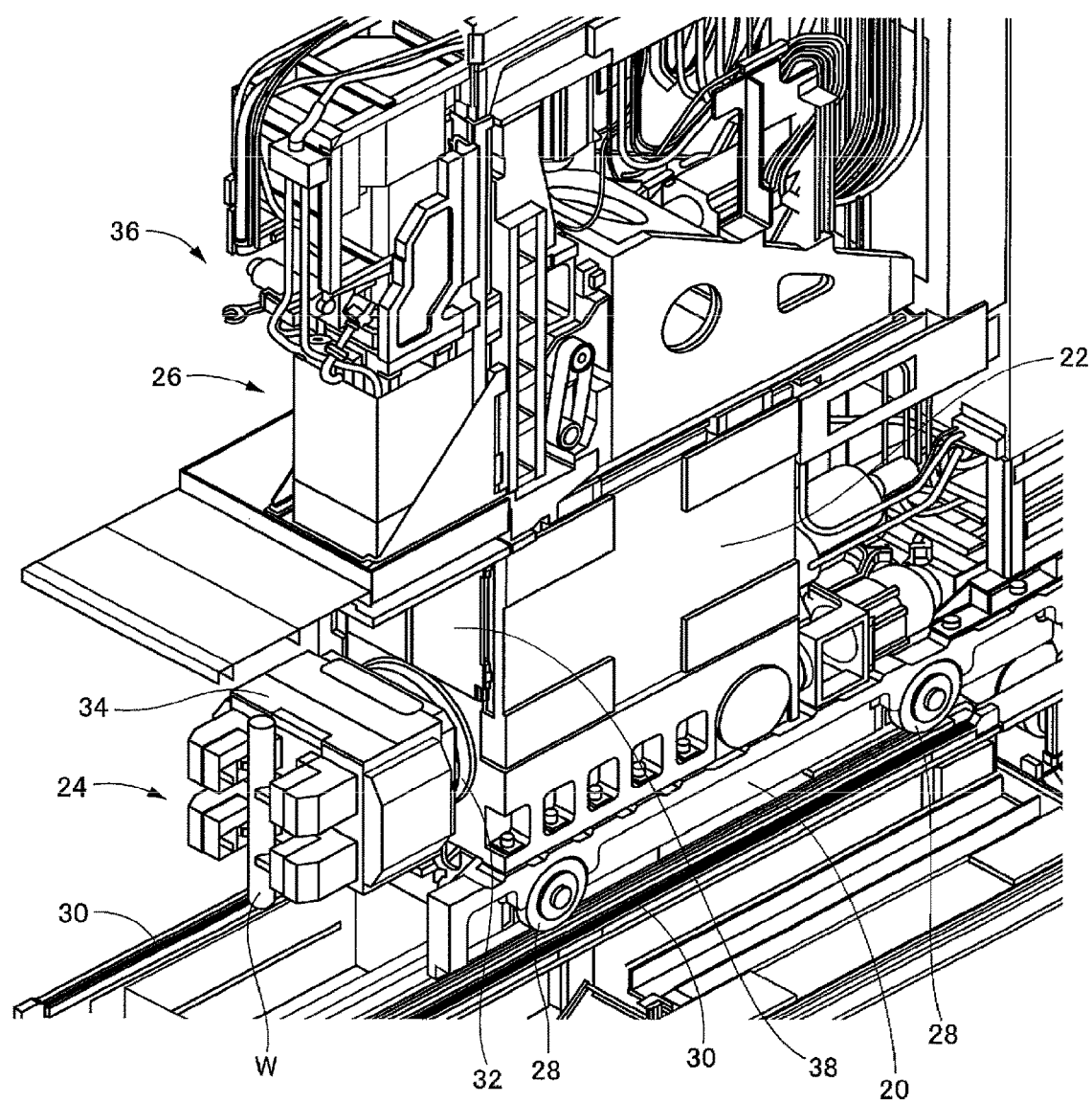
FIG. 3 is an enlarged perspective view illustrating a main portion of the centering machining module.

As for description with reference to FIG. 3 illustrating an enlarged main portion of the centering machining module 12, the workpiece holding device 24 is configured to include a support shaft 32 which is rotatably supported by the column 22, and a chuck 34 which is attached to a front end of the support shaft 32. The chuck 34 has a structure in which a workpiece W is pinched by claws from the left and the right. As the support 32 rotates by any angle, the workpiece W is fixed in any angular posture.

The machining head 26 has a spindle which is held in a posture extending in an up-down direction, and a tool holder which is held at a lower end of the spindle. The tool holder holds various types of tools, for example, a drill and an end-mill in a replaceable manner. The machining head 26 is moved by a head moving device 36 in the front-rear direction, the left-right direction, and the up-down direction. Various types of machining, such as drilling machining and milling machining, are performed with respect to the workpiece W in accordance with the holding tool.

A tool magazine is accommodated inside the column 22, and multiple replaceable tools are held in the tool magazine. In this centering machining module 12, a door 38 provided in front of the column 22 is opened, the tool magazine protrudes forward, and the tool is automatically replaced in such a state.

The centering machining module 12 is a so-called machining center, which is a general-purpose module. In this machining system, the centering machining module 12 mainly performs centering with respect to both ends of the workpiece W, that is, machining for boring a center hole, and machining for cutting end faces at both ends. Incidentally, machining for both ends is performed by the workpiece holding device 24 turning the workpiece W upside down.

[C] Vertical Lathe Module i) Overall Structure

Figure 4:
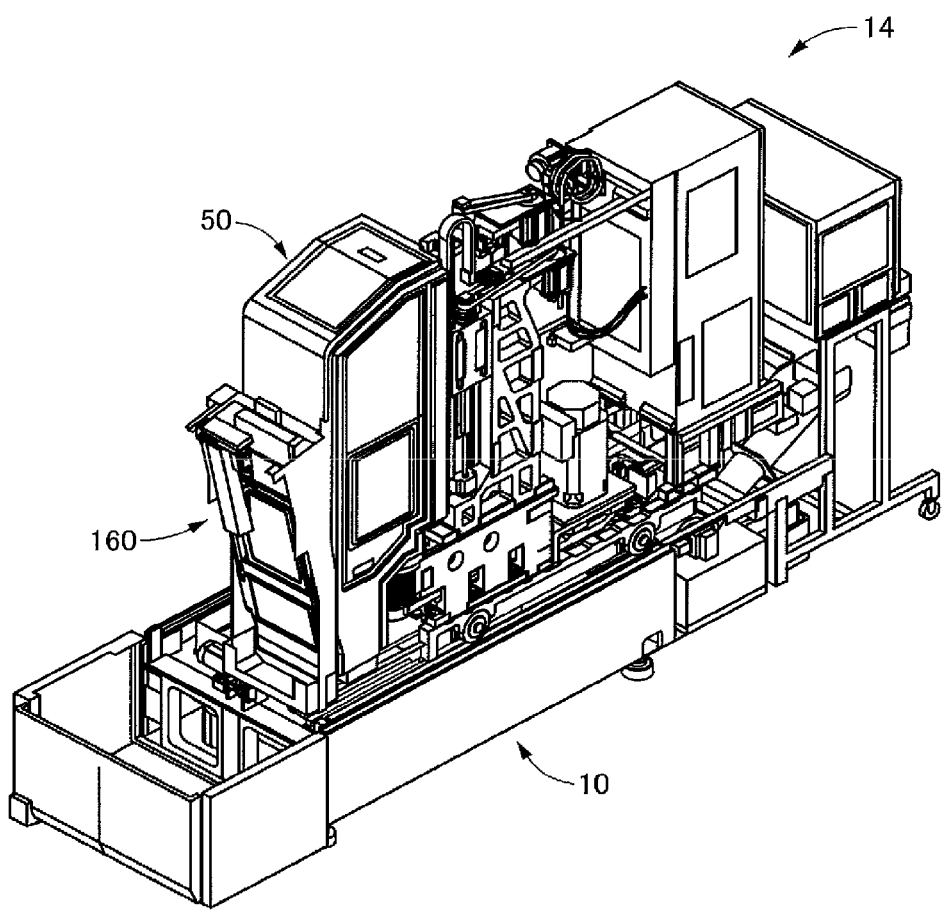
FIG. 4 is a perspective view illustrating a vertical lathe module disposed in the machining system in a state where the exterior panel is partially removed.
Figure 5:
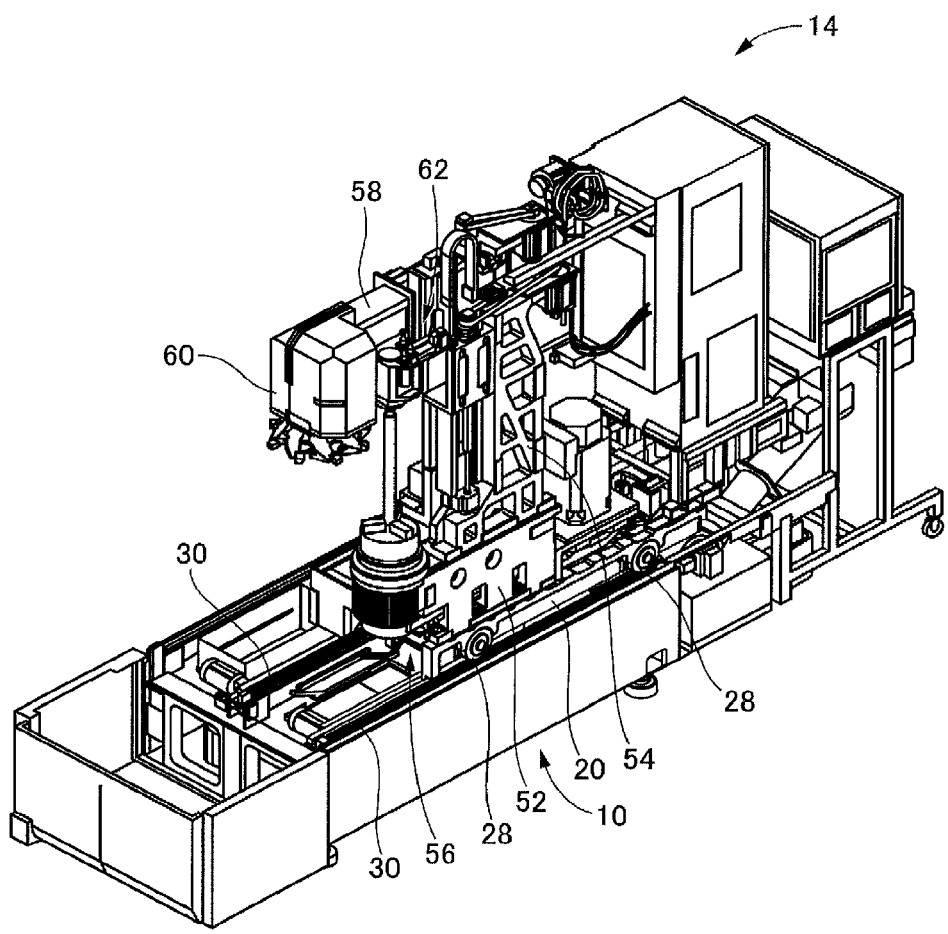
FIG. 5 is a perspective view illustrating the vertical lathe module in a state where the exterior panel is removed.

In the vertical lathe module 14, as seen from FIG. 4 illustrating a state where the exterior panel is partially removed and FIG. 5 illustrating a state where the exterior panel is entirely removed, a housing 50 is formed to partially include the exterior panel. The housing 50 defines a machining space and prevents scattering of the coolant, cut chips, and the like during lathe machining.

As seen from FIG. 5 illustrating a state having no housing 50, in a broad sense, the vertical lathe module 14 is configured to include the base 20, a base block 52 which is fixed to the base 20, a column 54 which is erected in the base block 52, a spindle device 56 which is supported by the base block 52, a beam 58 which is supported by the column 54, a turret 60 which is supported at a front end of the beam 58, and a tailstock device 62 by which a rotary center at an upper end of a workpiece is pressed downward.

The base 20 is the same as that of the centering machining module 12. Similarly, the wheels 28 are provided therein. Similar to the centering machining module 12, the vertical lathe module 14 is disposed on the base 10 such that the wheels 28 are settled on the rails 30. As the wheels 28 roll on the rails 30, the vertical lathe module 14 can be drawn out forward during replacement or the like of an edged tool (will be described below). Similarly, the vertical lathe module 14 can be drawn out rearward when being replaced with a different machining module.

Figure 6:
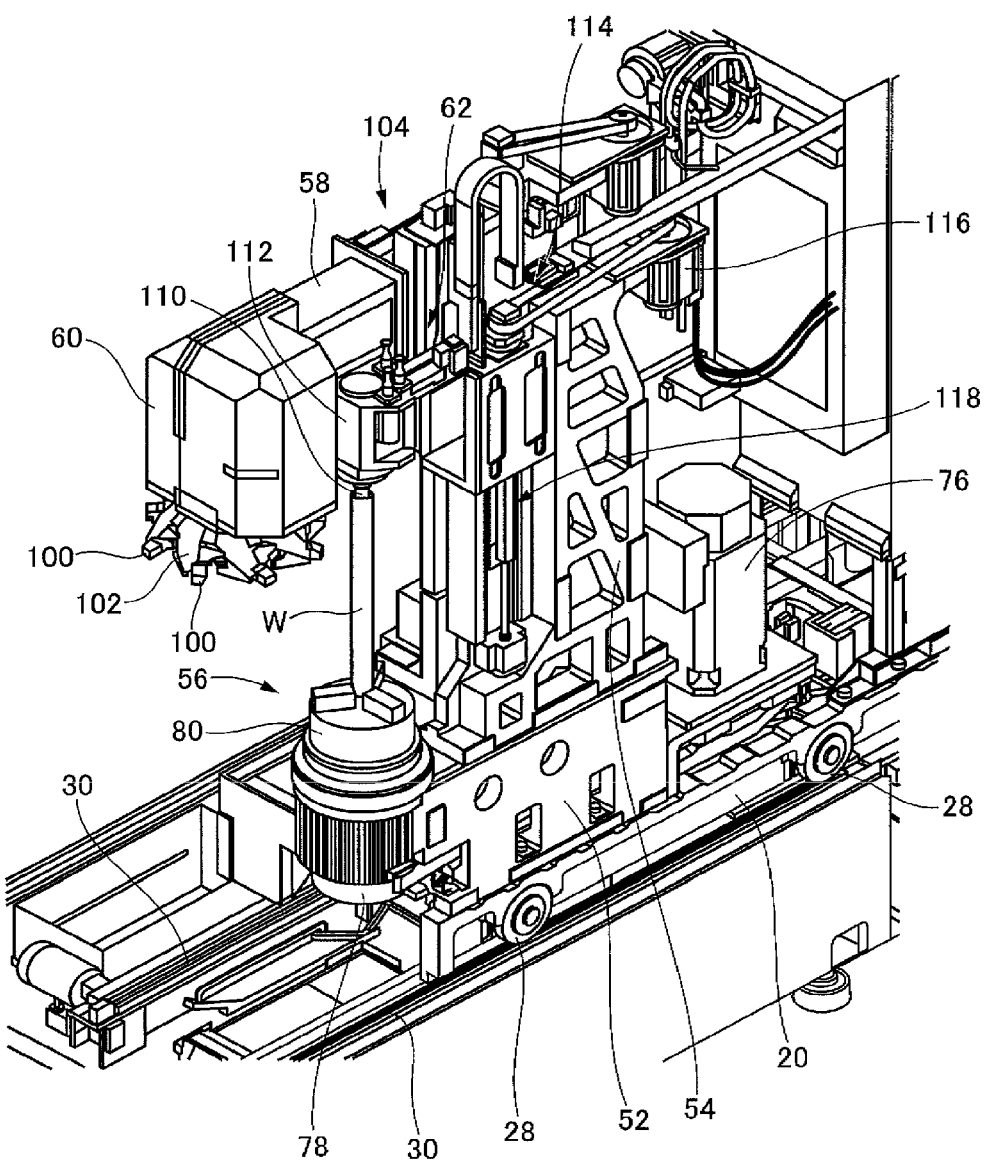
FIG. 6 is an enlarged perspective view illustrating a main portion of the vertical lathe module.
Figure 7:
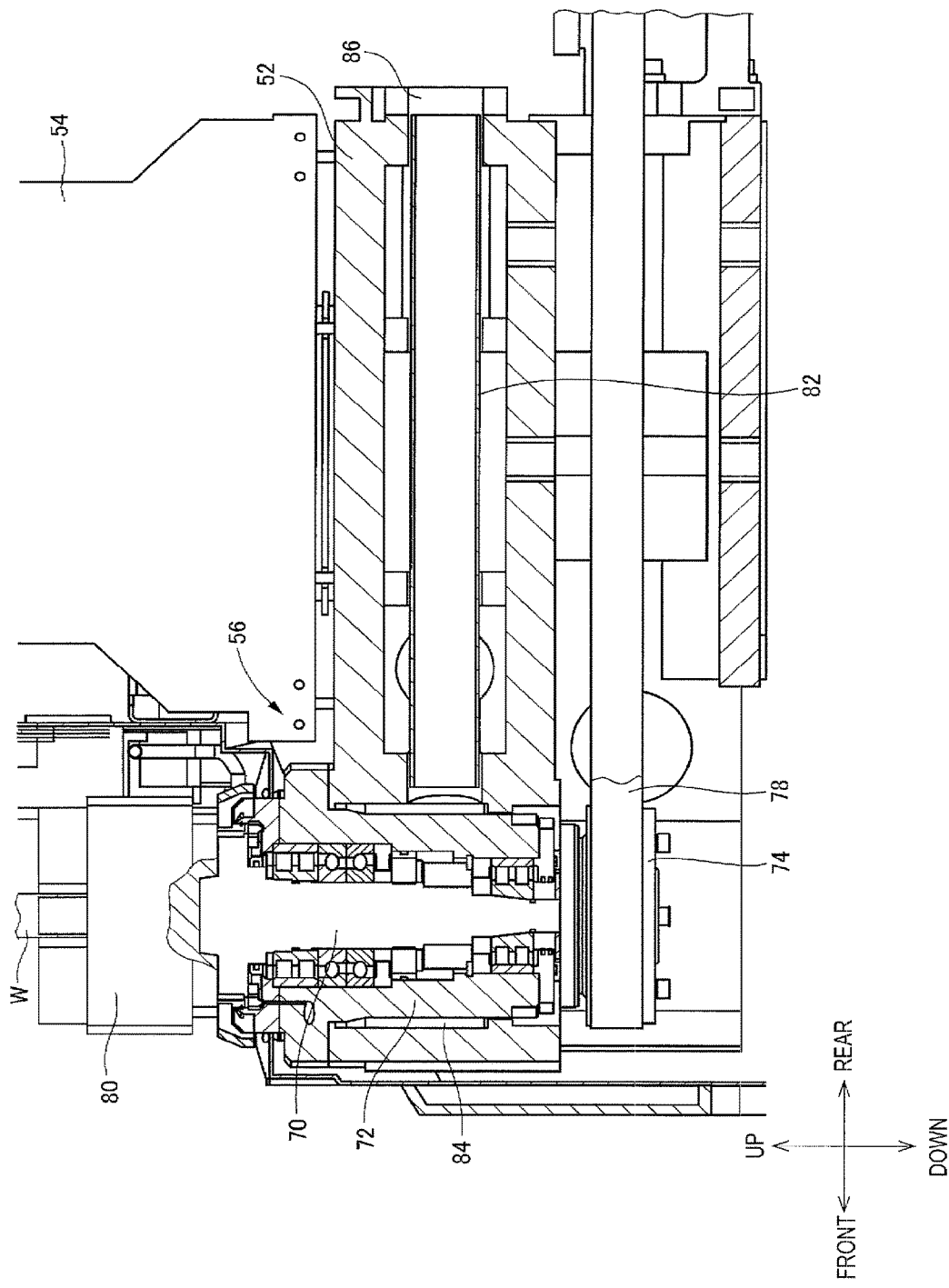
FIG. 7 is a view illustrating a cross section of a base block of the vertical lathe module.

As for description with reference to FIG. 6 illustrating an enlarged main portion, the base block 52 is disposed to deviate to the right side in the left-right direction of the vertical lathe module 14, and the spindle device 56 is supported by the base block 52. As for description with reference to FIG. 7 illustrating a cross section of the base block 52, the spindle device 56 has a spindle 70 and a spindle case 72 which rotatably holds the spindle 70. The spindle case 72 is fixed to a front end portion of the base block 52 in a posture in which a rotation axis line of the spindle 70 extends in the up-down direction. A pulley 74 is attached to a lower end portion of the spindle 70, and the spindle 70 rotates when rotation of a motor 76 disposed behind the base block 52 is transmitted via a timing belt 78 wound around the pulley 74. A chuck 80 for holding the workpiece W is attached to an upper end portion of the spindle 70, and the spindle 70 holds the workpiece W via the chuck 80.

A duct 82 is installed inside the base block 52 in a posture extending forward and rearward. A front end of the duct 82 is open to an annular cavity 84 which is present on the periphery of the spindle case 72, and a tail end of the duct 82 is open to a tail end portion of the base block 52. A fan 86 is installed at the tail end of the duct 82. Air inside the duct 82 is suctioned by the fan 86, and warm air near the spindle case 72 is suctioned via the duct 82 in accordance therewith. That is, the duct 82 and the fan 86 configure a spindle cooling device for cooling the spindle 70.

The column 54 erected in the base block 52 is disposed to deviate to the right side in the left-right direction of the vertical lathe module 14, and the beam 58 is supported by the column 54 on the side face of the column 54 on the left side. Therefore, the beam 58 is disposed to deviate to the left side in the left-right direction of the vertical lathe module 14. The beam 58 is supported to be movable in the front-rear direction and the up-down direction in a posture extending in the front-rear direction.

The turret 60 holds multiple edged tools 100 (specifically, "bits") on a horizontal circumference in a holding panel 102. One edged tool 100 to be used for cutting the workpiece W is positioned at a predetermined position by intermittently rotating the holding panel 102. Incidentally, the rotation axis line of the turret 60, specifically the rotation axis line of the holding panel 102 is parallel to the rotation axis line of the spindle 70. The turret 60 is supported at the front end of the beam 58 on its left side to be positioned at the center in the left-right direction of the vertical lathe module 14 (will be described below).

During cutting machining of the workpiece W, the turret 60 is moved in the front-rear direction and the up-down direction, and the movement is caused when the beam 58 is moved by a beam moving device 104. The beam moving device 104 is configured to move the beam 58 in the front-rear direction and the up-down direction.

ii) Tailstock Device

The tailstock device 62 is a device for causing the rotary center at the upper end of the workpiece W supported by the spindle 70 to be pressed downward. The tailstock device 62 is configured to include a rotation center 110 whose tip portion is pressed against the workpiece W from above, a tailstock 112 which holds the rotation center 110 and is supported by the column 54 to be movable in the up-down direction, and a tailstock moving device 114 which moves the tailstock 112 in the up-down direction. The tailstock moving device 114 is configured to include a servomotor 116 and to drive the tailstock 112 via a ball screw mechanism 118. The position of the tailstock 112 in the up-down direction can be precisely controlled by controlling the servomotor 116.

Figure 8:
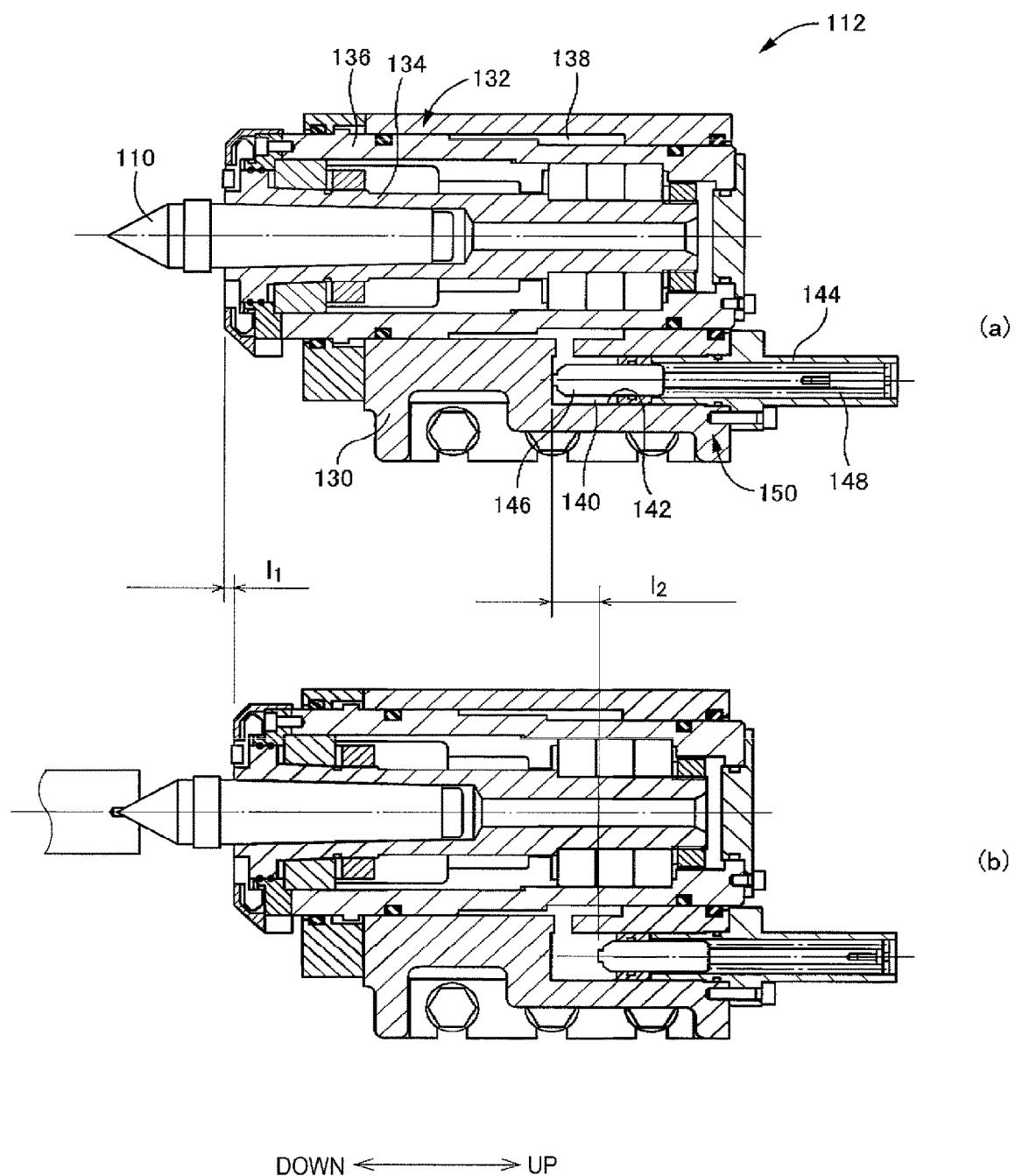
FIG. 8 is a cross-sectional view illustrating a tailstock configuring a tailstock device included in the vertical lathe module.

As illustrated in FIG. 8(a), the tailstock 112 is configured to include a casing 130 and a holder 132 which is held inside the casing 130 to be movable in the up-down direction. The holder 132 is constituted of an inner tube 134 and an outer tube 136 which are relatively rotatable with respect to each other. The rotation center 110 is inserted into the inner tube 134 and is held therein. An annular liquid chamber 138 is formed between the outer circumference of the holder 132, that is, the outer circumference of the outer tube 136 and the inner circumference of the casing 130. The liquid chamber 138 is defined by them and is filled with an operating fluid.

FIG. 8(a) illustrates a state where the holder 132 is positioned at a full-forward end with respect to the casing 130, and FIG. 8(b) illustrates a state where the rotation center 110 comes into contact with the workpiece W and the holder 132 has retreated by a certain distance 1 with respect to the casing 130. As seen from the drawings, the volume of the liquid chamber 138 is reduced in accordance with retreat of the holder 132 with respect to the casing 130. That is, the volume of the liquid chamber 138 is configured to fluctuate in accordance with a movement of the holder 132 with respect to the casing 130.

On the other hand, an auxiliary liquid chamber 140 filled with the operating fluid is formed inside the casing 130, specifically in a portion beside the holder 132. The auxiliary liquid chamber 140 is defined and formed by a hole 142 which is provided in the casing 130, a holding tube 144 which is inserted into the hole 142, and a plunger 146 which is held by the holding tube 144. The plunger 146 is installed to enter the auxiliary liquid chamber 140 and can move forward and rearward with respect to the auxiliary liquid chamber 140. The plunger 146 is biased downward by a compression coil spring 148 accommodated in the holding tube 144.

The liquid chamber 138 and the auxiliary liquid chamber 140 communicate with each other. In the case where the volume of the liquid chamber 138 fluctuates in accordance with a movement of the holder 132 with respect to the casing 130, the operating fluid flows in and out between the liquid chamber 138 and the auxiliary liquid chamber 140. In accordance with the operating fluid flowing in and out, the plunger 146 moves forward and rearward with respect to the auxiliary liquid chamber 140. In accordance with the forward and rearward movements, a biasing force of the compression coil spring 148 to the plunger 146 changes. The biasing force is transmitted to the holder 132 via the operating fluid, and a force corresponding to the biasing force acts on the holder 132.

Specifically, in the case where the rotation center 110 comes into contact with the workpiece W and the holder 132 has retreated by a distance $l_1$ with respect to the casing 130, as illustrated in FIG. 8(b), the plunger 146 retreats by a distance $l_2$, and the holder 132 is biased downward depending on a biasing force of the compression coil spring 148 corresponding to the distance $l_2$. The biased force becomes a force of the rotation center 110 pressing the workpiece W.

That is, a mechanism constituted of the auxiliary liquid chamber 140, the plunger 146, the compression coil spring 148, and the like is a pressure applying mechanism 150 which applies a pressure corresponding to a fluctuation in volume of the liquid chamber 138 to the operating fluid inside the liquid chamber 138 in order to generate a force reducing a movement of the holder 132 with respect to the casing 130 with a magnitude corresponding to an amount of the movement. The tailstock device 62 is configured to generate a force of the rotation center 110 pressing the workpiece W, depending on the pressure applying mechanism 150.

Therefore, in the tailstock device 62, since a force of the rotation center 110 pressing the workpiece W changes in accordance with the amount of movement of the holder 132 with respect to the casing 130, the pressing force, that is, a force pressing the workpiece W can be precisely controlled by controlling the downward movement amount of the tailstock 112 after the rotation center 110 comes into contact with the workpiece W. According to the tailstock device 62, since a pressing force is generated via the operating fluid, unlike a case where a pressing force is directly generated by a spring, the workpiece W can be pressed in a relatively smooth manner.

In the drawings, only one of each of the auxiliary liquid chamber 140, the plunger 146, the compression coil spring 148, and the like is provided. However, actually, three of each of the auxiliary liquid chamber 140, the plunger 146, the compression coil spring 148, and the like are provided in parts on the periphery of the holder 132. The tailstock 112 becomes relatively compact by providing multiple auxiliary liquid chambers 140, multiple plungers 146, multiple compression coil springs 148, and the like. The pressing force can be changed by installing another compression coil spring having a different spring constant, in place of the compression coil spring 148.

iii) Positional Relationship between Spindle and Turret

Figure 9:
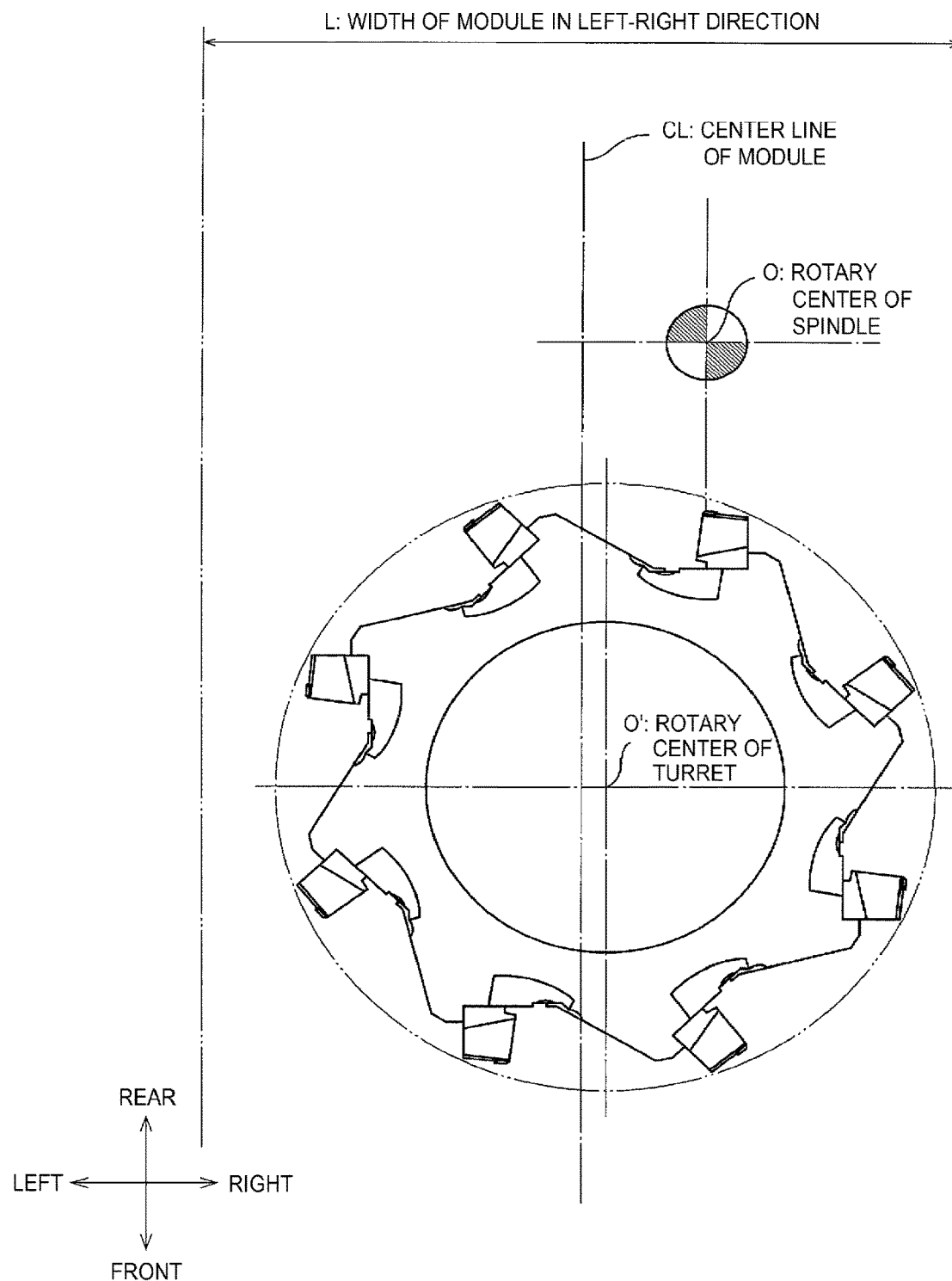
FIG. 9 is a schematic view illustrating a positional relationship between a spindle and a turret included in the vertical lathe module viewed from above.

As for description with reference to FIG. 9 regarding a positional relationship between the spindle 70 and the turret 60 in the vertical lathe module 14, that is, a positional relationship between the workpiece and the turret 60 at a machining position, in this vertical lathe module 14, the spindle 70 and the turret 60 are disposed to be misaligned in the front-rear direction. Specifically, a rotary center O of the spindle 70 is positioned behind a rotary center O' of the turret 60. This misalignment contributes to reducing a width L of the vertical lathe module 14 in the left-right direction.

Since the turret 60 is positioned in front, in the case where the vertical lathe module 14 is drawn out from the base 10 and the edged tools 100 are replaced, the drawing amount thereof can be reduced.

Meanwhile, the rotary center O' of the turret 60 is present in the vicinity of a center line CL of the vertical lathe module 14 in the left-right direction. In contrast, the rotary center O of the spindle 70 is eccentrically disposed on the right side to a relatively significant extent. Therefore, even when machining of a relatively long workpiece is performed, the machining can be easily performed without causing the beam 58 to interfere with the workpiece by causing the beam 58 supporting the turret 60 to be eccentrically disposed on the left side to a certain extent. In addition, due to the beam 58 eccentrically disposed on the left side, the tailstock device 62 is easily disposed. That is, since the tailstock 112 has to be disposed above the spindle 70, the beam 58 eccentrically disposed on the left side, in other words, the spindle 70 eccentrically disposed on the right side also contributes to avoiding interference between an operation of the beam 58 and an operation of the tailstock 112.

Since the vertical lathe module 14 includes the constituent elements having the positional relationship as described above, the vertical lathe module 14 itself can be compact in size in the left-right direction, and the entire machining system can also be configured to be compact in size.

iv) Structure of Housing

The housing 50 illustrated in FIG. 4 is configured to partially include the exterior panel and defines the machining space for preventing scattering of the coolant, cut chips, and the like during lathe machining. The housing 50 a pair of front and rear side walls in addition to a pair of left and right side walls in order to surround a workpiece supported by the spindle 70, and the turret 60.

Figure 10:
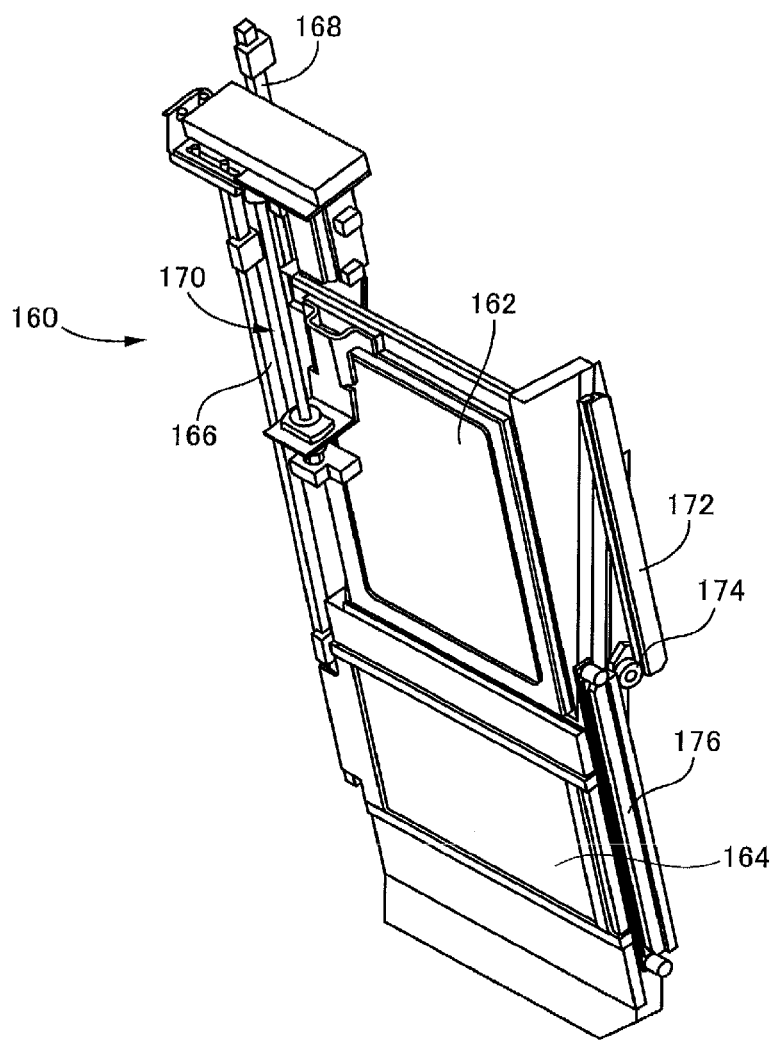
FIG. 10 is a perspective view illustrating a shutter in a closed state provided in a housing included in the vertical lathe module.

Since a workpiece is carried in and out with respect to the machining space from the front, the front side wall has a workpiece conveying opening 158 (refer to FIG. 11) and a shutter 160 for opening and closing the workpiece conveying opening 158. As seen from FIG. 10 illustrating a closed state, the shutter 160 is configured to include multiple shutter plates constituted of an upper shutter plate 162 and a lower shutter plate 164 which are disposed to be aligned with each other in the up-down direction. In general, the upper shutter plate 162 is configured to cover the upper half of the workpiece conveying opening 158 and the lower shutter plate 164 is configured to cover the lower half of the workpiece conveying opening 158, respectively.

In a main body (fixed portion independent from the two shutter plates) of the housing 50, a first guide 166 and a second guide 168 extending in a direction slightly oblique to the up-down direction (which will hereinafter simply be referred as the "up-down direction" related to the shutter 160 sometimes) in a manner parallel to each other are provided on the left side of the upper shutter plate 162 and the lower shutter plate 164. Each of the upper shutter plate 162 and the lower shutter plate 164 is movable in the up-down direction along the first guide 166 and the second guide 168, that is, in a predetermined movement direction. In the main body of the housing 50, as a mechanism for moving the upper shutter plate 162 in a shutter plate movement direction, an upper shutter plate moving mechanism 170 configured to include a motor, a ball screw mechanism, and the like is provided.

In addition, in the main body of the housing 50, an upper rack bar 172 is fixed on the right side of the upper shutter plate 162 in a posture extending in the up-down direction. A pinion 174 meshing with the upper rack bar 172 is rotatably supported on the right side face of the upper shutter plate 162, and a lower rack bar 176 meshing with the pinion 174 is fixed on the right side face of the lower shutter plate 164 in a posture extending in the up-down direction.

Figure 11:
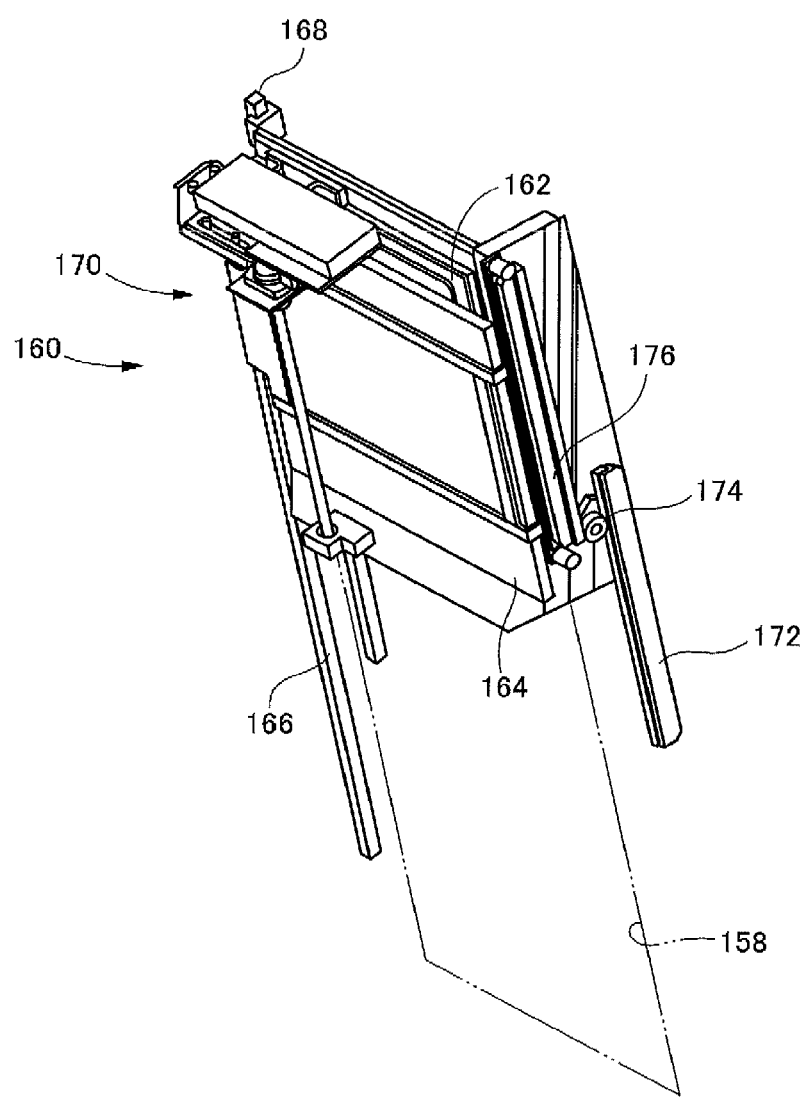
FIG. 11 is a perspective view illustrating the shutter in an opened state.

In a state as illustrated in FIG. 10, if the upper shutter plate 162 is moved upward by the upper shutter plate moving mechanism 170, the pinion 174 rolls in accordance therewith, and the lower shutter plate 164 also moves upward together with the lower rack bar 176 in accordance therewith. That is, the upper shutter plate 162 and the lower shutter plate 164 move in an interlocked manner, thereby resulting in a state as illustrated in FIG. 11. In such a state, the upper shutter plate 162 and the lower shutter plate 164 overlap each other, and the workpiece conveying opening 158 is open. Incidentally, if the upper shutter plate 162 is moved downward from the state by the upper shutter plate moving mechanism 170, the upper shutter plate 162 and the lower shutter plate 164 return to the state of FIG. 10 in an interlocked manner.

Based on the structure described above, the shutter 160 has a mechanism which is configured to include the first guide 166, the second guide 168, the upper shutter plate moving mechanism 170, the upper rack bar 172, the pinion 174, the lower rack bar 176, and the like, that is, a telescopic shutter plate moving mechanism which vertically moves the multiple shutter plates 162 and 164 in an interlocked manner to open and close the workpiece conveying opening 158 such that a state where the multiple shutter plates 162 and 164 overlap each other and a state where the multiple shutter plates are disposed to be aligned with one another in the up-down direction are selectively realized. Since the shutter 160 having such a mechanism, that is, a telescopic shutter is provided, in this vertical lathe module 14, the workpiece conveying opening 158 can be relatively increased in the up-down direction, and a relatively long workpiece is easily carried in and carried out.

Figure 12:
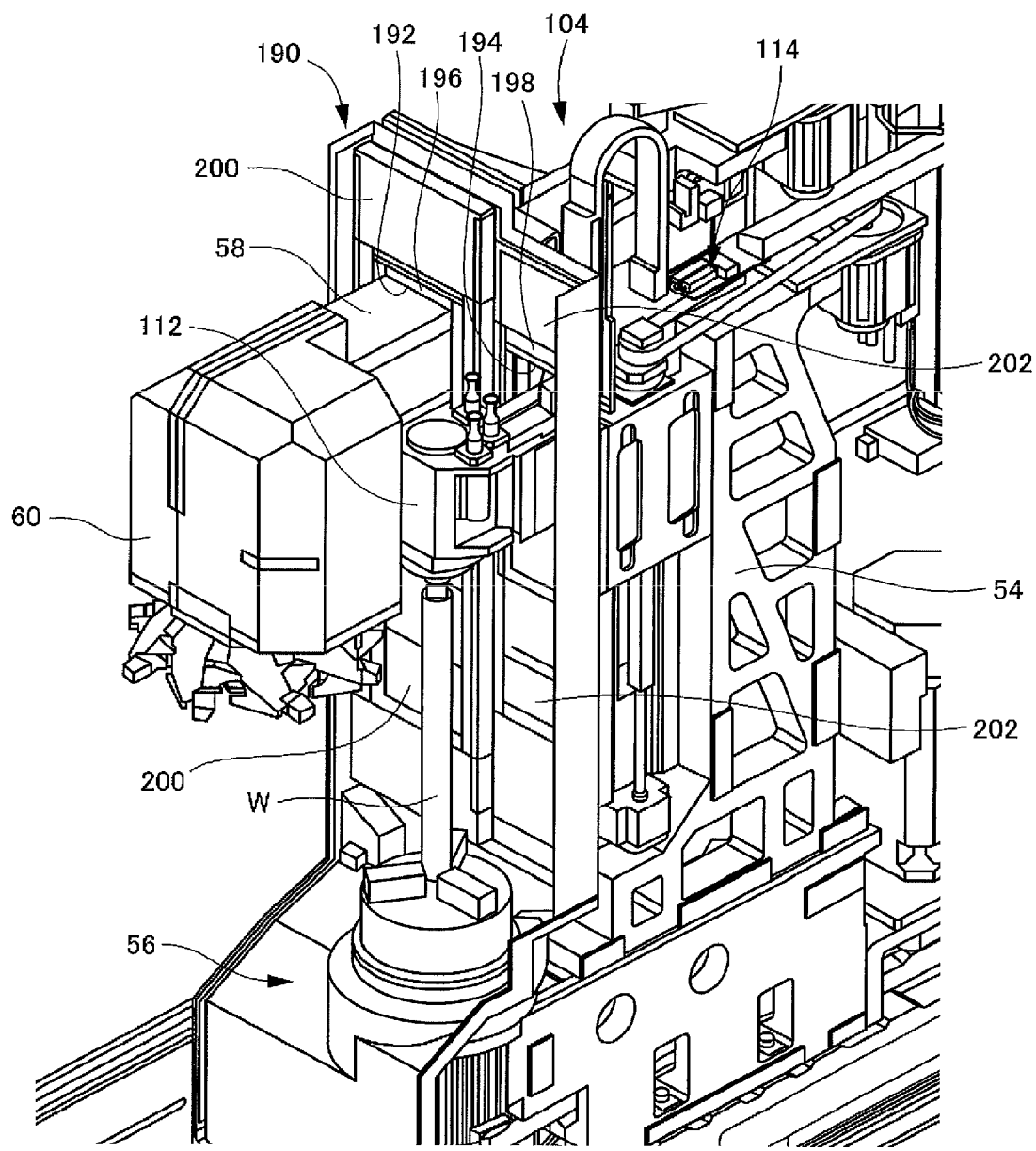
FIG. 12 is a perspective view illustrating a cover provided on a rear side of the housing.

On the other hand, as illustrated in FIG. 12, a portion of the housing 50 on the rear side forms a cover 190 which extends in the front-rear and left-right directions along the column 54. The cover 190 is provided with a beam opening 192 which allows the beam 58 to be inserted through the inside of the housing 50, and a tailstock opening 194 which allows the tailstock 112 to enter the inside of the housing 50. Since the beam 58 is vertically moved by the beam moving device 104 and the tailstock 112 is vertically moved by the tailstock moving device 114, respectively, the housing 50 is provided with a beam opening movement allowing mechanism which maintains the defined machining space and allows the beam opening 192 to vertically move in accordance with a vertical movement of the beam 58, and a tailstock opening movement allowing mechanism which maintains the defined machining space and allows the tailstock opening 194 to vertically move in accordance with a vertical movement of the tailstock 112. That is, there is provided a mechanism which prevents the coolant and the like from scattering rearward from the machining space and allows the beam opening 192 and the tailstock opening 194 to move in the up-down direction.

Specifically, the beam opening 192 and the tailstock opening 194 are respectively defined and formed by frames 196 and 198 through which base end sections of the beam 58 and the tailstock 112 can pass. Multiple cover plates 200 are installed above and below the frame 196 and multiple cover plates 202 are installed above and below the frame 198, respectively. Specifically, four cover plates 200 are disposed both above and below the frame 196 which defines the beam opening 192, and three cover plates 202 are disposed both above and below the frame 198 which defines the tailstock opening 194.

The state illustrated in the drawing is a state where the beam 58 and the tailstock 112 are positioned at the uppermost positions within a movable range. In such a state, four cover plates 200 disposed above the frame 196 defining the beam opening 192 are in a state where all thereof overlap one after the other, and four cover plates 200 disposed below the frame 196 are in a state where all thereof partially overlap each other but are disposed to be aligned with one another in the up-down direction in general. Similarly, three cover plates 202 disposed above the frame 198 defining the tailstock opening 194 are in a state where all thereof overlap one after the other, and three cover plates 202 disposed below the frame 198 are in a state where all thereof partially overlap each other but are disposed to be aligned with one another in an up-down direction in general.

The frames 196 and 198 also move in the up-down direction along with movements of the beam 58 and the tailstock 112 in the up-down direction. In a case where the beam 58 moves downward from the state illustrated in FIG. 12, the cover plates 200 disposed above the frame 196 are spread in the up-down direction. In addition, the cover plates 200 disposed below the frame 196 are superimposed in the up-down direction. When the beam 58 is in a state of being positioned at the lowermost position within the movable range, the cover plates 200 disposed above the frame 196 are in a state where all thereof partially overlap each other but are disposed to be aligned with one another in the up-down direction in general, and the cover plates 200 disposed below the frame 196 are in a state where all thereof overlap one after the other. Similarly, in a case where the tailstock 112 moves downward, the cover plates 202 disposed above the frame 198 are spread in the up-down direction. In addition, the cover plates 202 disposed below the frame 198 are superimposed in the up-down direction. When the tailstock 112 is in a state of being positioned at the lowermost position within the movable range, the cover plates 202 disposed above the frame 198 are in a state where all thereof partially overlap each other but are disposed to be aligned with one another in the up-down direction in general, and the cover plates 202 disposed below the frame 198 are in a state where all thereof overlap one after the other.

The cover 190 performing operations as described above and including the frames 196 and 198 and the multiple cover plates 200 and 202 is configured to have telescopic cover plate movement allowing mechanisms allowing the multiple cover plates 200 and 202 to move in accordance with movements of the frames 196 and 198. Each thereof includes the telescopic cover plate movement allowing mechanism, thereby configuring the beam opening movement allowing mechanism and the tailstock opening movement allowing mechanism described above by employing the mechanisms, the housing 50 can ensure movements of the beam 58 and the tailstock 112 over a relatively long distance in the up-down direction and can prevent the coolant and the like from scattering rearward from the machining space.

Figure 13:
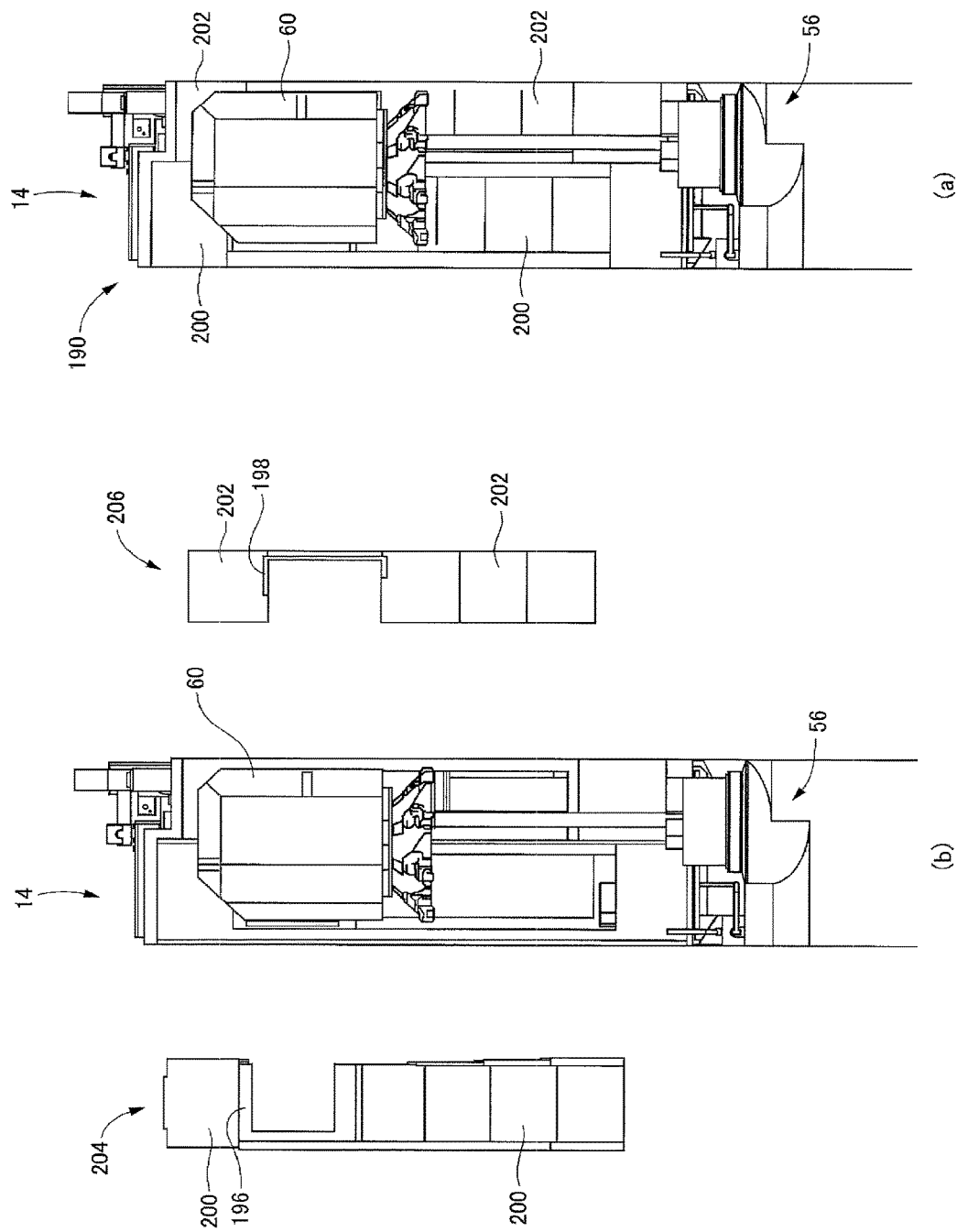
FIG. 13 is a front view illustrating a situation where the cover is separated to the left and the right.

As for more description with reference to FIG. 13, the cover 190 is attached as in FIG. 13(*a*). The frame 196 defining the beam opening 192 has a square-bracket shape, specifically a shape open toward the right (toward the tailstock opening movement allowing mechanism), and the frame 198 defining the tailstock opening 194 has a square-bracket shape, specifically a shape open toward the left (toward the beam opening movement allowing mechanism). Accordingly, as illustrated in FIG. 13(*b*), the cover 190 can be separated to the left and the right. Furthermore, the beam opening movement allowing mechanism and the tailstock opening movement allowing mechanism disposed to be aligned with each other in the left-right direction are independent units, that is, two units 204 and 206, which can be detached to be separated to the left and the right.

In the housing 50, since the cover 190 can be separated as described above, it is possible to detach the cover 190 without being hindered by the beam 58 and the tailstock 112 present in the machining space. Accordingly, cleaning and maintenance of the cover 190 can be easily performed.

[D] Workpiece Conveyance and Attaching-Detaching Robot

Figure 14:
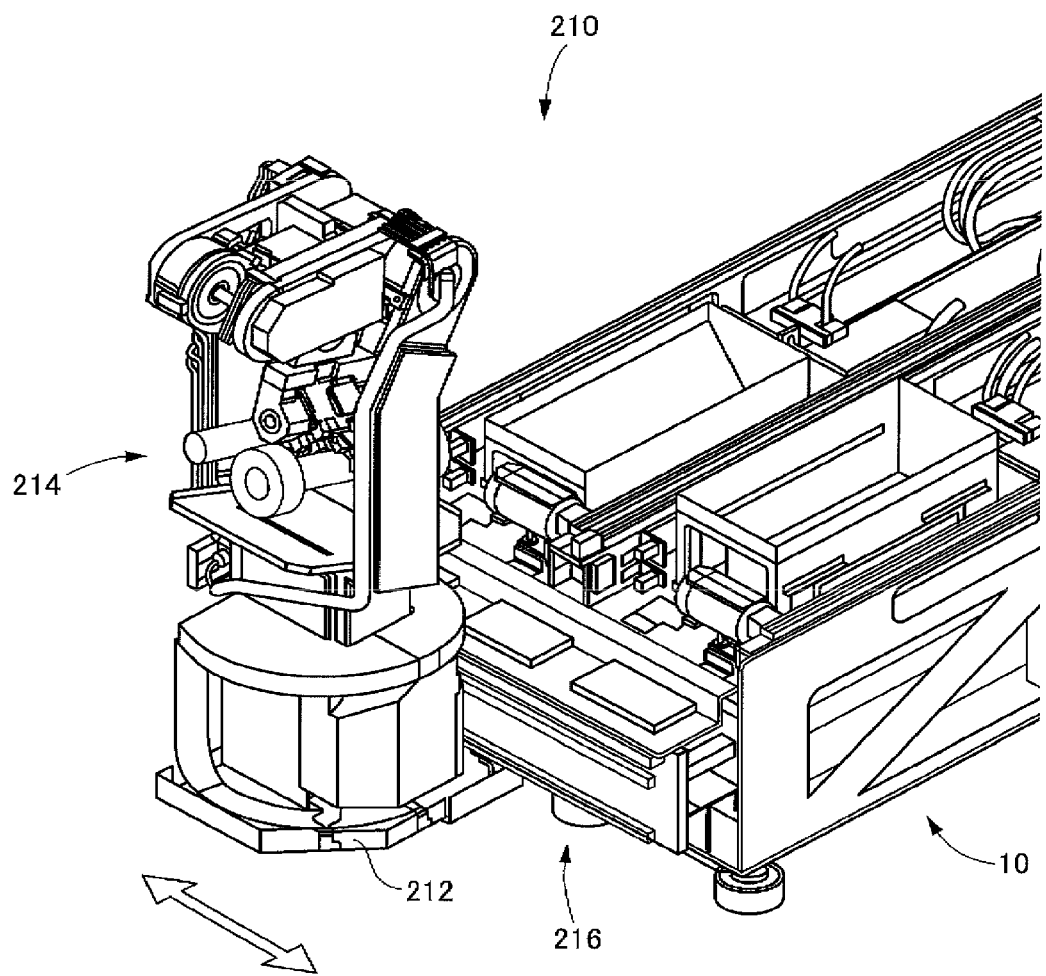
FIG. 14 is a perspective view illustrating a situation where a workpiece conveyance and attaching-detaching robot is disposed in the machining system.

As described above, the workpiece conveyance and attaching-detaching robot for conveying a workpiece and attaching and detaching the workpiece with respect to each of the centering machining module 12 and the vertical lathe module 14 is disposed in front of the base 10. As for description with reference to FIG. 14, a workpiece conveyance and attaching-detaching robot 210 is disposed in front of the base 10, specifically is disposed to be supported by the front side face of the base 10.

In a broad sense, the workpiece conveyance and attaching-detaching robot 210 can be divided into a main body section 214 which has a base 212, and a base moving device 216 which moves the base 212 in the left-right direction in order to move the main body section 214 in the left-right direction. Since the base moving device 216 is supported by the front side face of the base 10, the workpiece conveyance and attaching-detaching robot 210 is supported by the front side face of the base 10. The base moving device 216 uses a servomotor as a driving source, and an operation of moving the base 212 is controlled by a robot control device (not illustrated).

Figure 15:
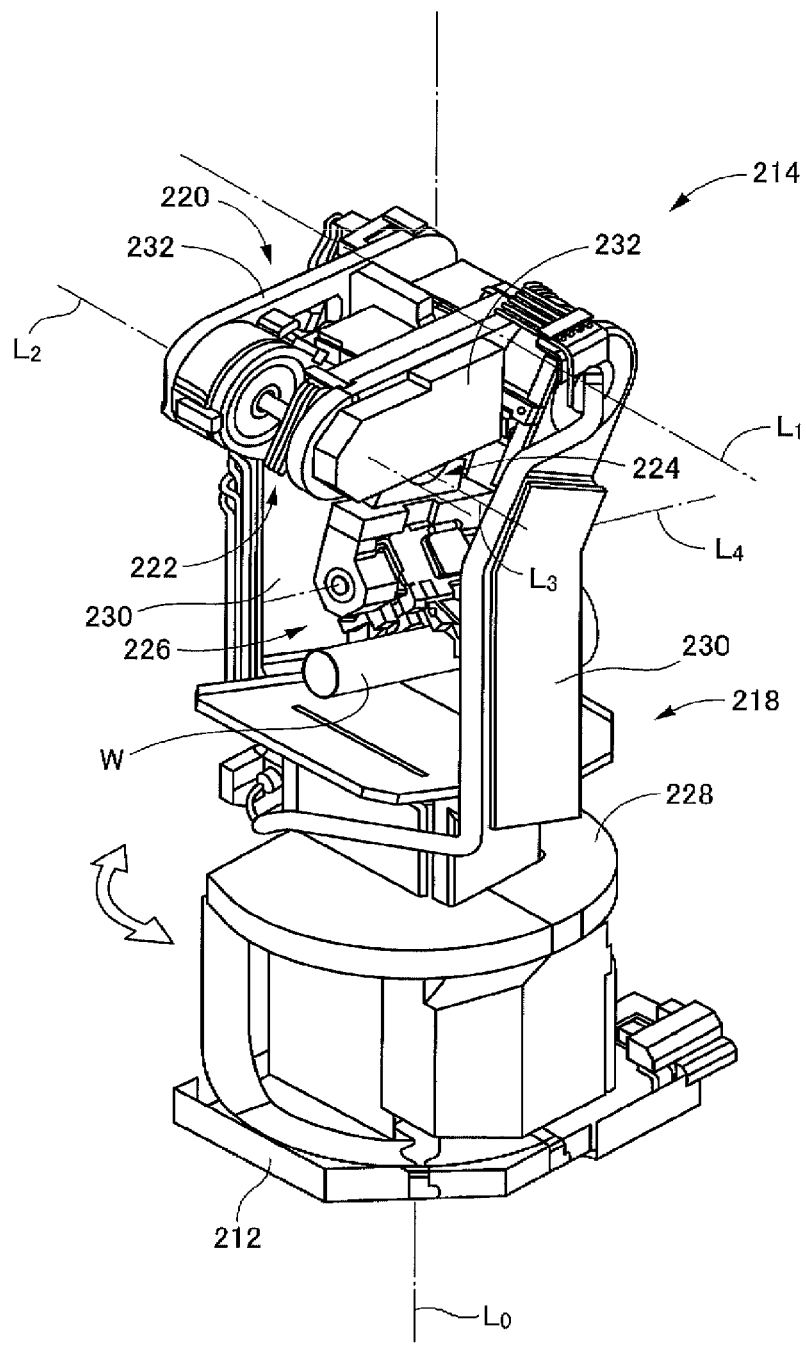
FIG. 15 is a perspective view illustrating a main body section of the workpiece conveyance and attaching-detaching robot in a posture for conveyance.
Figure 16:
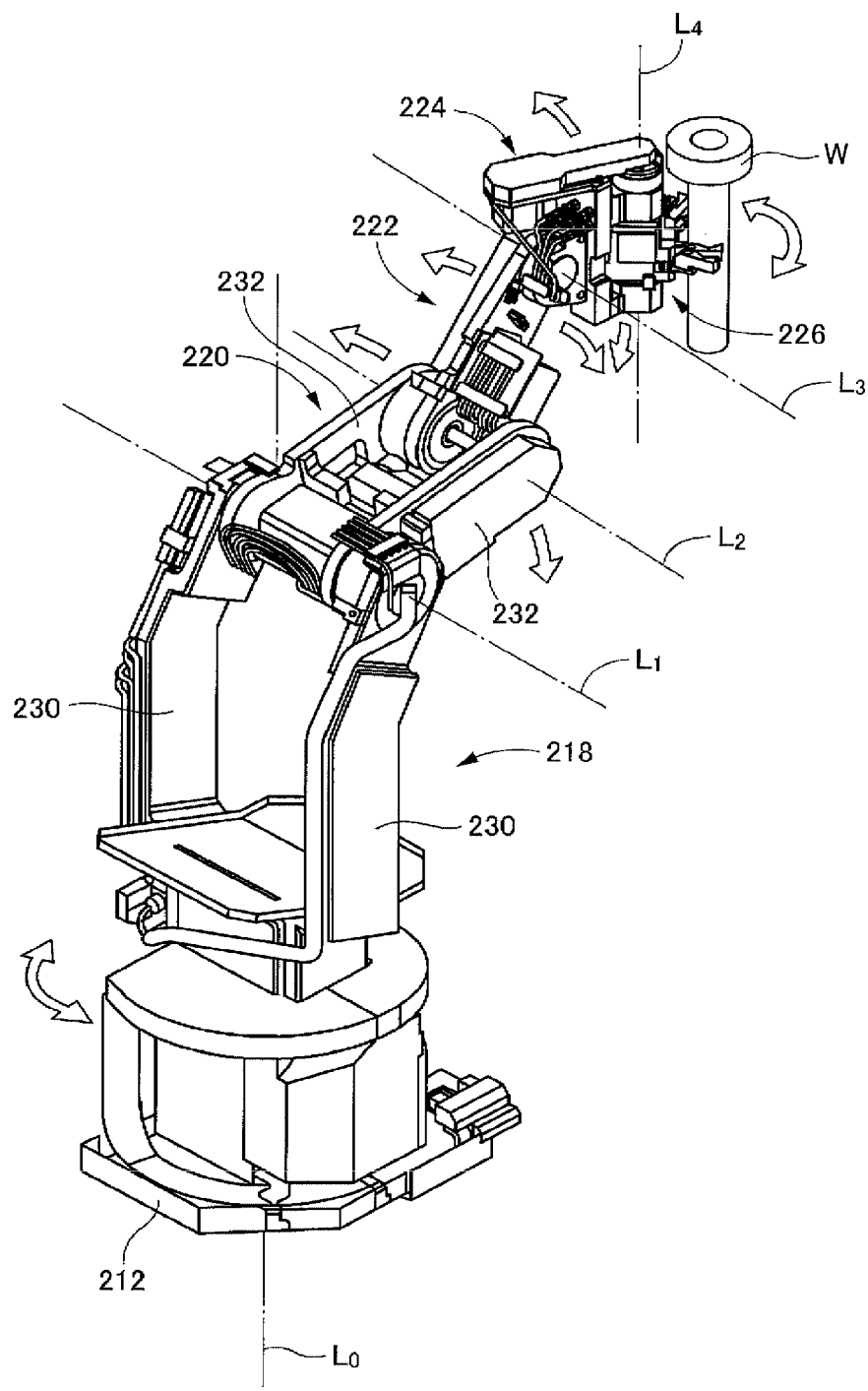
FIG. 16 is a perspective view illustrating the main body section of the workpiece conveyance and attaching-detaching robot in a posture for attachment and detachment.

As for description with reference to FIG. 15 illustrating a posture for conveyance, that is, a posture when a workpiece is conveyed to the left and the right and FIG. 16 illustrating a posture for attachment and detachment, that is, a posture when a workpiece is attached and detached with respect to each of the centering machining module 12 and the vertical lathe module 14, in a broad sense, the main body section 214 of the workpiece conveyance and attaching-detaching robot 210 is configured to include the base 212, a support member 218, a first arm 220, a second arm 222, a wrist member 224, and a workpiece holder 226. The main body section 214 is a so-called articulated robot.

The support member 218 has a base plate 228 and a pair of struts 230 erected in the base plate 228. The pair of struts 230 each extends in the up-down direction and is erected with a space therebetween. In the base plate 228, the support member 218 is supported by the base 212 to be rotatable around a rotation axis line $L_0$ extending in the up-down direction. The base 212 is internally equipped with a support member rotating device, and the support member 218 is rotated around the rotation axis line $L_0$ by the support member rotating device.

The first arm 220 is supported at its base end section by upper end portions of the pair of struts 230 of the support member 218 to be interposed between the pair of struts 230. The first arm 220 is configured to include a pair of arm plates 232 fixedly connected to each other with a space therebetween. The first arm 220 is rotatable around a first rotation axis line $L_1$ perpendicular to the up-down direction with respect to the support member 218. The second arm 222 is supported at its base end section by the tip portion of the first arm 220 to be interposed between the pair of arm plates 232. The second arm 222 is rotatable around a second rotation axis line $L_2$ parallel to the first rotation axis line $L_1$ with respect to the first arm 220. The wrist member 224 is supported by the tip portion of the second arm 222 to be rotatable around a third rotation axis line $L_3$ parallel to the first rotation axis line $L_1$ and the second rotation axis line $L_2$.

Figure 17:
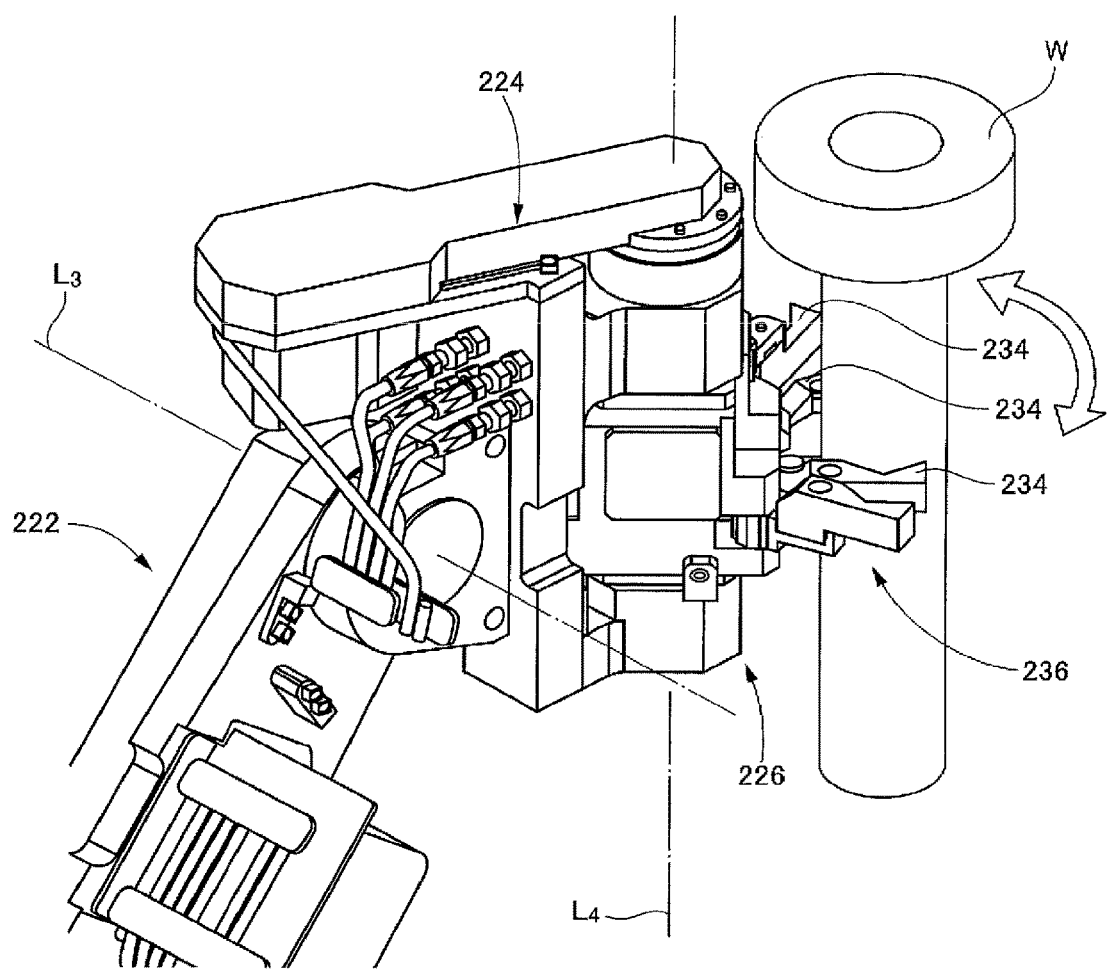
FIG. 17 is an enlarged perspective view illustrating a workpiece holder included in the workpiece conveyance and attaching-detaching robot.

As for description with reference to FIG. 17, the workpiece holder 226 has a clamp 236 as a main constituent configured to include one pair of gripping claws 234 for gripping the workpiece W. In this workpiece conveyance and attaching-detaching robot 210, two pairs of gripping claws 234, that is, two clamps 236 are provided. Accordingly, multiple workpiece holders 226, specifically two workpiece holders 226 are included therein. Since each of the two workpiece holders 226 holds the workpiece W, this workpiece conveyance and attaching-detaching robot 210 can hold multiple workpieces W, specifically two workpieces W at the same time. The workpiece holder 226 is held by the wrist member 224 to be able to oscillate around a rocking axis line $L_4$ extending in a manner parallel to a surface perpendicular to the first rotation axis line $L_1$, the second rotation axis line $L_2$, and the third rotation axis line $L_3$.

A rotary operation of each of the first arm 220, the second arm 222, and the wrist member 224 and an oscillating operation of the workpiece holder 226 are individually performed by an actuating device having a servomotor as a driving source, and the operations thereof are controlled by the robot control device described above.

Since this workpiece conveyance and attaching-detaching robot 210 employs the first arm 220 and the second arm 222 connected to each other, that is, two arms linked in serial, the main body section 214 has a high degree of freedom in posture. Accordingly, it is possible to attach and detach a workpiece with a high degree of freedom.

In addition, in the posture for conveyance illustrated in FIG. 15, the first arm 220 and the second arm 222 are configured to be in a folded state, and in such a state, the first arm 220, the second arm 222, the wrist member 224, the workpiece holder 226 and the workpiece W held by the workpiece holder 226 is accommodated between the pair of struts 230 configuring the support member 218. Therefore, this workpiece conveyance and attaching-detaching robot 210 can hold the workpiece W in a compact posture and can convey the workpiece W between the centering machining module 12 and the vertical lathe module 14, thereby contributing to realizing a compact size of the machining system itself.

As described above, the position at which a workpiece to be subjected to machining by the vertical lathe module 14 is mounted is a position deviated to the right side from the center in the left-right direction of the module 14. On the other hand, the position at which the workpiece is mounted in the centering machining module 12 is a position in the middle of the module 12 in the left-right direction. That is, the modules 12 and 14 have different workpiece mounting positions in the left-right direction. This workpiece conveyance and attaching-detaching robot 210 copes with such a difference between the mounting positions by causing the workpiece holder 226 to oscillate around the rocking shaft line $L_4$ in a state where the main body section 214 is positioned in front of each of the modules 12 and 14. That is, since the workpiece holder 226 can oscillate, it is possible to attach and detach a workpiece with a very high degree of freedom.

In addition, as described above, this workpiece conveyance and attaching-detaching robot 210 has the multiple workpiece holders 226, and each of the workpiece holders 226 can hold a workpiece at the same time. Therefore, it is possible to separate (unload) a workpiece from one module and to mount (load) a workpiece in the module in a sequential manner, so that it is possible to shorten a time for attaching and detaching.

Moreover, in this workpiece conveyance and attaching-detaching robot 210, the main body section 214, that is, the base 212 is rotatable around the rotation axis line. Therefore, a workpiece before machining can be carried into the machining system and a workpiece after machining can be carried out from the machining system. Specifically, in a state where the main body section 214 is positioned in front of the centering machining module 12, a workpiece can be carried in from the left side of the centering machining module 12 by causing the main body section 214 to be in a leftward posture. In addition, in a state where the main body section 214 is positioned in front of the vertical lathe module 14, a workpiece can be carried out to the right side of the vertical lathe module 14 by causing the main body section 214 to be in a rightward posture.

[E] Alternative Embodiment

In the machining system of Example, two modules 12 and 14 are disposed on one base 10. However, for example, three or more modules can be disposed by increasing the base, or configuring one base with two or more bases 10 disposed to be aligned with one another. In that case, for example, it is possible to additionally disposed one or more vertical lathe modules 14.

In addition, in Example described above, the centering machining module 12 and the vertical lathe module 14 are disposed. However, it is possible to dispose a different module, for example, a different machining module such as a horizontal lathe module. Moreover, it is possible to dispose not only a module for machining but also a module for processing performed before or after machining.

REFERENCE SIGNS LIST

10: base, 12: centering machining module [machining module], 14: vertical lathe module [machining module], 50:

housing, 54: column, 56: spindle device, 58: beam, 60: turret, 62: tailstock device, 70: spindle, 72: spindle case, 100: edged tool, 104: beam moving device, 110: rotation center, 112: tailstock, 114: tailstock moving device, 130: casing, 132: holder, 138: liquid chamber, 140: auxiliary liquid chamber, 146: plunger, 148: compression coil spring, 150: pressure applying mechanism, 158: workpiece conveying opening, 160: shutter, 162: upper shutter plate, 164: lower shutter plate, 170: upper shutter plate moving mechanism, 190: cover, 192: beam opening, 194: tailstock opening, 196, 198: frame, 200, 202: cover plate, 210: workpiece conveyance and attaching-detaching robot, 212: base, 216: base moving device, 218: support member, 220: first arm, 222: second arm, 224: wrist member, 226: workpiece holder, 230: strut

The invention claimed is:

1. A machining system comprising:
a base; and
a plurality of machining modules which are detachably disposed on the base to be aligned with one another in a left-right direction,
wherein machining is sequentially performed by the plurality of machining modules with respect to a workpiece,
wherein at least one of the plurality of machining modules is a vertical lathe module,
wherein the vertical lathe module includes a spindle which supports a lower end portion of a workpiece and rotates the workpiece around an axis line extending in an up-down direction; a column which is erected behind the spindle; a beam which is supported by the column in a posture extending in a front-rear direction to be movable in the up-down direction and the front-rear direction; a turret which is supported at a front end of the beam, holds a plurality of edged tools, and is intermittently rotatable around an axis line parallel to the axis line of the spindle; and a beam moving device which moves the beam in the up-down direction and the front-rear direction in order to move the turret when machining of a workpiece is performed, and
wherein the beam is disposed to deviate to one side and the spindle is disposed to deviate to the other side in the left-right direction individually from a center of the vertical lathe module in the left-right direction.

2. A machining system comprising:
a base; and
a plurality of machining modules which are detachably disposed on the base to be aligned with one another in a left-right direction,
wherein machining is sequentially performed by the plurality of machining modules with respect to a workpiece,
wherein at least one of the plurality of machining modules is a vertical lathe module,
wherein the vertical lathe module includes a spindle which supports a lower end portion of a workpiece and rotates the workpiece around an axis line extending in an up-down direction; a column which is erected behind the spindle; a beam which is supported by the column in a posture extending in a front-rear direction to be movable in the up-down direction and the front-rear direction; a turret which is supported at a front end of the beam, holds a plurality of edged tools, and is intermittently rotatable around an axis line parallel to the axis line of the spindle; and a beam moving device which moves the beam in the up-down direction and the front-rear direction in order to move the turret when machining of a workpiece is performed,
wherein the vertical lathe module includes a tailstock device by which a rotary center at an upper end of a workpiece supported by the spindle is pressed downward, and
wherein the tailstock device has a rotation center whose tip portion is pressed against a workpiece, a tailstock which holds the rotation center and is supported by the column to be movable in the up-down direction along the column, and a tailstock moving device which moves the tailstock in the up-down direction.

3. The machining system according to claim 2,
wherein the tailstock includes a casing; a holder which is held inside the casing to be movable in the up-down direction and holds the rotation center; a liquid chamber which is defined by the casing and the holder, an inside of which is filled with an operating fluid, and a volume of which fluctuates due to a movement of the holder with respect to the casing; and a pressure applying mechanism which applies a pressure corresponding to a fluctuation in volume of the liquid chamber to the operating fluid inside the liquid chamber in order to generate a force reducing a movement of the holder with respect to the casing with a magnitude corresponding to an amount of the movement, and
wherein the tailstock device is configured to generate a force of the rotation center pressing a workpiece, depending on the pressure applying mechanism.

4. A machining system comprising:
a base; and
a plurality of machining modules which are detachably disposed on the base to be aligned with one another in a left-right direction,
wherein machining is sequentially performed by the plurality of machining modules with respect to a workpiece,
wherein at least one of the plurality of machining modules is a vertical lathe module,
wherein the vertical lathe module includes a spindle which supports a lower end portion of a workpiece and rotates the workpiece around an axis line extending in an up-down direction; a column which is erected behind the spindle; a beam which is supported by the column in a posture extending in a front-rear direction to be movable in the up-down direction and the front-rear direction; a turret which is supported at a front end of the beam, holds a plurality of edged tools, and is intermittently rotatable around an axis line parallel to the axis line of the spindle; and a beam moving device which moves the beam in the up-down direction and the front-rear direction in order to move the turret when machining of a workpiece is performed,
wherein the vertical lathe module includes a housing surrounding a workpiece supported by the spindle and the turret in order to define a machining space in front of the column,
wherein the housing has a workpiece conveying opening which is provided in front of the housing for carrying in and carrying out a workpiece with respect to the machining space, and a shutter for opening and closing the workpiece conveying opening, and
wherein the shutter has a plurality of shutter plates which are disposed to be aligned with one another in an up-down direction in a state where the shutter is closed and each of which partially covers the workpiece conveying opening, and a telescopic shutter plate moving mechanism which vertically moves the plurality of shutter plates in an interlocked manner to open and close the workpiece conveying opening such that a state where the plurality of shutter plates overlap each other and a state where the plurality of shutter plates are disposed to be aligned with one another in the up-down direction selectively realized.

5. The machining system according to claim 1,
wherein the vertical lathe module includes a housing surrounding a workpiece supported by the spindle and the turret in order to define a machining space in front of the column,
wherein the vertical lathe module includes a tailstock device by which a rotary center at an upper end of a workpiece supported by the spindle is pressed downward,
wherein the tailstock device has (a) a rotation center whose tip portion is pressed against a workpiece, (b) a tailstock which holds the rotation center and is supported by the column to be movable in the up-down direction along the column, and (c) a tailstock moving device which moves the tailstock in the up-down direction,
wherein the housing has a beam opening and a tailstock opening which are each provided on a rear side while the beam opening allows the beam to be inserted through an inside of the housing and the tailstock opening allows the tailstock to enter the inside of the housing, a beam opening movement allowing mechanism which maintains the machining space defined by the housing and allows the beam opening to vertically move in accordance with a vertical movement of the beam, and a tailstock opening movement allowing mechanism which maintains the machining space defined by the housing and allows the tailstock opening to vertically move in accordance with a vertical movement of the tailstock, and
wherein each of the beam opening movement allowing mechanism and the tailstock opening movement allowing mechanism has a frame which defines the opening and is vertically movable, a plurality of cover plates which are respectively disposed above and below the frame, and a telescopic cover plate movement allowing mechanism which allows the plurality of cover plates to move in accordance with a movement of the frame between a state where the plurality of cover plates overlap each other and a state where the plurality of cover plates are disposed to be aligned with one another in the up-down direction.

* * * * *

UNITED STATES PATENT AND TRADEMARK OFFICE
CERTIFICATE OF CORRECTION

| | |
|---|---|
| PATENT NO. | : 10,434,616 B2 |
| APPLICATION NO. | : 15/764588 |
| DATED | : October 8, 2019 |
| INVENTOR(S) | : Jun Suzuki et al. |

It is certified that error appears in the above-identified patent and that said Letters Patent is hereby corrected as shown below:

On the Title Page

Item (73), the Assignee's city is incorrect. Item (73) should read:
-- (73) Assignee: FUJI CORPORATION, Chiryu-shi (JP) --

Signed and Sealed this
Fourteenth Day of April, 2020

Andrei Iancu
*Director of the United States Patent and Trademark Office*